(12) United States Patent
Shcherbina et al.

(10) Patent No.: US 12,443,539 B2
(45) Date of Patent: Oct. 14, 2025

(54) DATA PROCESSORS

(71) Applicant: Arm Limited, Cambridge (GB)

(72) Inventors: Nikolai Shcherbina, Trondheim (NO);
Sebastian Marc Blasius, Trondheim (NO); Jussi Tuomas Pennala, Oulu (FI); Akshay Vijayashekar, Trondheim (NO)

(73) Assignee: Arm Limited, Cambridge (GB)

( * ) Notice: Subject to any disclaimer, the term of this patent is extended or adjusted under 35 U.S.C. 154(b) by 101 days.

(21) Appl. No.: 17/652,013

(22) Filed: Feb. 22, 2022

(65) Prior Publication Data

US 2022/0276966 A1  Sep. 1, 2022

(30) Foreign Application Priority Data

Feb. 26, 2021 (GB) ...................................... 2102764

(51) Int. Cl.
*G06F 12/10* (2016.01)
(52) U.S. Cl.
CPC ........ *G06F 12/10* (2013.01); *G06F 2212/657* (2013.01)
(58) Field of Classification Search
CPC .. G06F 12/10; G06F 12/1009; G06F 12/1018; G06F 12/1027; G06F 12/1036; G06F 12/1045; G06F 12/1054; G06F 12/1063; G06F 12/1072; G06F 12/1081
See application file for complete search history.

(56) References Cited

U.S. PATENT DOCUMENTS

| 10,642,734 | B1 * | 5/2020 | Pillai | G06F 13/1657 |
| 2014/0122807 | A1 * | 5/2014 | Chang | G06F 12/1009 |
| | | | | 711/202 |
| 2016/0196073 | A1 * | 7/2016 | Zhang | G06F 3/0611 |
| | | | | 711/167 |
| 2017/0177477 | A1 * | 6/2017 | Sutera | G06F 12/0607 |
| 2019/0087327 | A1 * | 3/2019 | Kanno | G06F 12/0261 |
| 2022/0197824 | A1 * | 6/2022 | Koren | G06F 12/0284 |
| 2023/0168915 | A1 * | 6/2023 | Bishop | G06F 21/53 |
| | | | | 718/1 |

FOREIGN PATENT DOCUMENTS

EP          20275093      * 5/2020  ............. G06F 21/53

OTHER PUBLICATIONS

Memory Access Optimization of a NN Accelerator by Wei Pub Feb. 10, 2021 (Year: 2021).*

(Continued)

*Primary Examiner* — Paul M Knight
(74) *Attorney, Agent, or Firm* — Pearl Cohen Zedek Latzer Baratz LLP

(57) ABSTRACT

In a data processing system in which varying numbers of channels for accessing a memory can be configured, the communications channel to use for an access to the memory is determined by mapping a memory address associated with the memory access to an intermediate address within an intermediate address space, selecting, based on the number of channels configured for use to access the memory, a mapping operation to use to determine from the intermediate address which channel to use for the memory access, and using the selected mapping operation to determine from the intermediate address which channel to use for the memory access.

20 Claims, 14 Drawing Sheets

(56) References Cited

OTHER PUBLICATIONS

An Adaptive Non Uniform Cache Structure by Kim 2002 (Year: 2002).*
NPL Alam Do It Yourself Virtual Memory Translation 2017.*
NPL Finley Virtual Memory 2000.*
NPL Jacob Memory Systems 2008.*
NPL Udipi Rethinking DRAM Design and Organization 2010.*

* cited by examiner

DATA PROCESSORS

CROSS-REFERENCE TO RELATED APPLICATIONS

This application claims priority pursuant to 35 U.S.C. 119(a) to United Kingdom Patent Application No. 2102764.4, filed Feb. 26, 2021, which application is incorporated herein by reference in its entirety.

BACKGROUND

The technology described herein relates to data processors and data processing systems and in particular to data processors and data processing systems that support the use of plural channels via which to access memory.

A data processing system will typically include a memory in which data will be stored. Functional units of the data processing system will access the memory (and thus read data from or write data to the memory) via an appropriate communications channel, either directly (in which case the memory channel will be to the (physical) memory device itself), or via an intermediate storage element, such as a cache or cache hierarchy, (logically) between the functional unit and the memory (in which case, the channel to the memory will be to and include the cache (and the cache will, in effect, act as a "memory channel")).

Some data processing systems support the use of plural independent such memory channels. For example, there could be plural buses via which the memory can be directly accessed, and/or plural caches via which data can be transferred to and from the memory.

In such arrangements, it is usually desirable to distribute the memory traffic across the multiple memory channels, as that will tend to provide better overall system performance. The memory traffic may be distributed across the multiple channels by, for example, allocating different memory addresses within the overall address space of the memory to different memory channels.

The Applicants believe that there remains scope for improvements to the operation of data processors and data processing systems that support the use of multiple channels to memory.

BRIEF DESCRIPTION OF THE DRAWINGS

Embodiments of the technology described herein will now be described by way of example only and with reference to the accompanying drawings, in which.

Like reference numerals are used for like features throughout the drawings, where appropriate.

DETAILED DESCRIPTION

Figure 1:
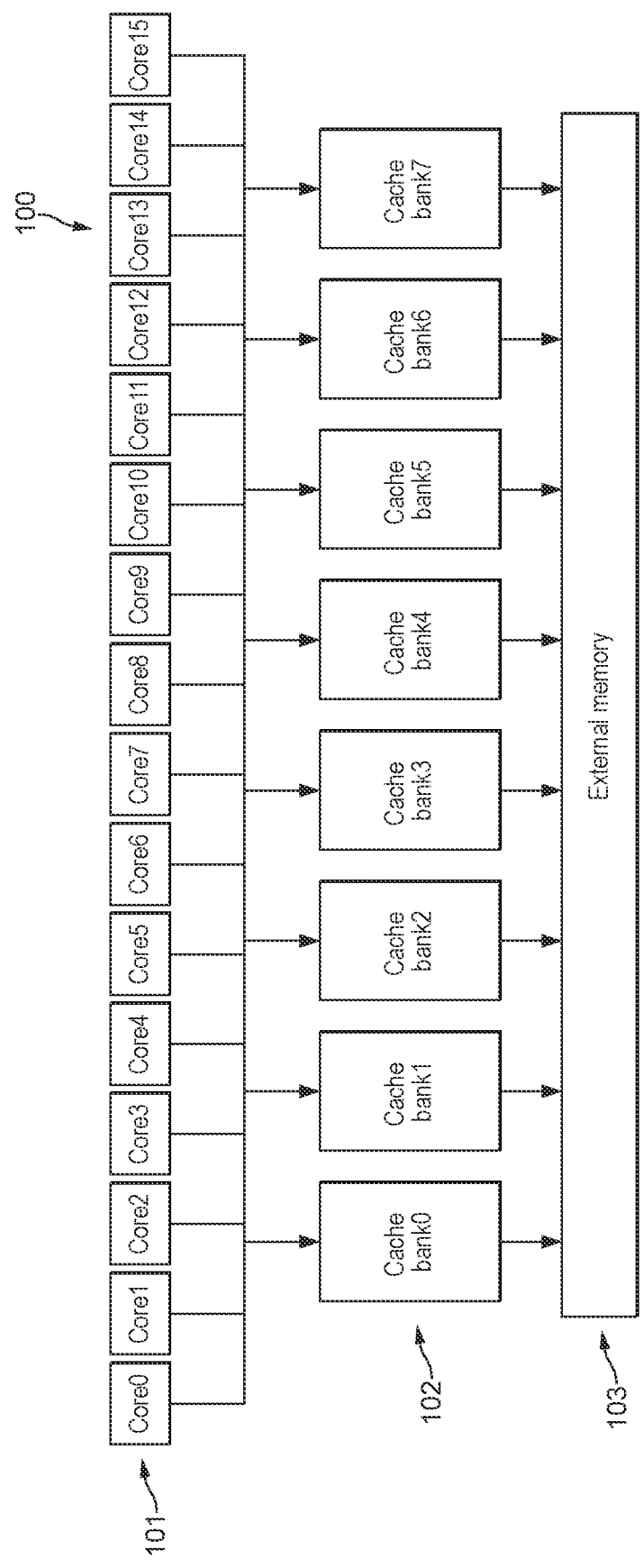
FIG. 1 shows schematically a data processing system an embodiment.

A first embodiment of the technology described herein comprises a method of determining which communication channel of a plurality of communications channels to use when accessing memory in a data processing system in which varying numbers of communication channels for accessing the memory can be configured, the method comprising:

determining which communications channel of a plurality of communications channels that have been configured for use to access a memory, to use for an access to the memory, by:

mapping a memory address associated with the memory access to an intermediate address within an intermediate address space;

selecting based on the number of channels configured for use to access the memory, a mapping operation to use to determine from the intermediate address which channel of the plurality of channels configured for use to access the memory to use for the memory access; and using the selected mapping operation to determine from the intermediate address which channel of the plurality of channels configured for use to access the memory to use for the memory access;

the method further comprising:

using the determined communications channel for the memory access.

A second embodiment of the technology described herein comprises an apparatus for determining which communication channel of a plurality of communications channels to use when accessing memory in a data processing system in which varying numbers of communication channels for accessing memory can be configured, the apparatus comprising:

a memory channel determining circuit configured to determine which communications channel of a plurality of communications channels that have been configured for use to access a memory to use for an access to the memory, the memory channel determining circuit comprising:

an address mapping circuit configured to map a memory address associated with a memory access to an intermediate address within an intermediate address space; and a memory channel mapping circuit configured to:

select based on a number of channels configured for use to access the memory, a mapping operation to use to determine from the intermediate address which channel of the plurality of channels configured for use to access the memory to use for the memory access; and use the selected mapping operation to determine from the intermediate address which channel of the plurality of channels configured for use to access the memory to use for the memory access.

The technology described herein relates to the operation of a data processor and data processing system in the situation where a plurality of channels are available for accessing memory, and more particularly where the number of available "memory channels" can vary, e.g. by setting a different memory channel configuration at "bootup" and/or "runtime".

The Applicants have recognised in this regard that in the case where the number of memory channels can be varied in use, it may be difficult to provide a single, fixed, mapping of memory addresses to different channels that is able to distribute memory traffic across the channels in a suitable manner for all possible combinations of plural memory channels that may be used. Furthermore, while it may be possible to determine a "bespoke" mapping of memory addresses to memory channels for each possible combination of plural channels that may be used, that may require an undesirably large amount of analysis.

The technology described herein instead first maps the memory addresses used for memory accesses to an intermediate address space, and then those intermediate addresses are mapped to the different memory channels. Moreover the mapping of the intermediate addresses to the different memory channels is selected based on the number of memory channels being used.

As will be discussed further below, the Applicants have recognised and found that this arrangement can provide a relatively simple, but effective and efficient, mechanism for distributing memory traffic between plural different memory channels, particularly in the situation where the number of channels being used can be varied, and that can reduce, for example, the risk of "bottlenecks" arising.

In particular, and as will be discussed further below, the initial mapping of memory addresses to the intermediate address space can be, and is in an embodiment, used to provide a modified distribution of the memory accesses in the intermediate address space as compared to in the memory address space, and which is configured to then work (more) efficiently with the operation(s) that then maps the intermediate addresses to the different memory channels.

For example, and as will be discussed further below, the Applicants have recognised that while the expected distribution of memory accesses in the memory address space may not really be suitable nor lend itself to then being mapped directly to varying numbers of memory channels in an efficient manner for each and every combination of plural memory channels that may be used, it can be, and is, possible to map the expected memory access pattern in the memory address space to a modified distribution of the memory accesses in the intermediate address space that is then suitable for use with a mapping that can relatively simply and straightforwardly map the intermediate address space to different numbers of memory channels in an efficient manner, and in a way that will, for example, and in an embodiment, reduce the risk of "bottlenecks" occurring in any given memory channel.

Furthermore, the two stage process of the technology described herein means that the mapping of the memory addresses to the intermediate address space can be done based on the (expected) memory traffic and without any dependence on the number of channels (since it is the second stage of the process that takes account of the number of memory channels actually being used), thereby allowing, for example, and in an embodiment, the same mapping operation to intermediate addresses to be used irrespective of the number of the number of memory channels that are being used at the time.

The memory (memory system) that is being accessed may comprise any suitable and desired memory and memory system of the data processing system in question, such as a memory that is dedicated to a particular data processor of the data processing system, or a memory of the data processing system that is shared by plural processors (and/or other elements) of the data processing system. Other arrangements would, of course, be possible.

The memory will have a given, defined (physical) address space (set of addresses) that memory accesses can address. In general, the memory will support an address space corresponding to the set of addresses that can be indicated using addresses of a particular size (width), such as 64, 40, or 32-bit addresses. Each memory access will then indicate the, e.g. 40-bit, address (memory location) to which it relates.

(It should be noted in this regard that while the memory addressing configuration will define a corresponding memory address space, and it will generally be preferred that all addresses within that address space are validly available (as memory locations where data can be stored), it could be the case that certain addresses within the memory address space are invalid (not available for use) and so will not be used in any memory accesses. This does not affect the operation in the manner of the technology described herein, as the technology described herein will operate to map any memory address that is used to a corresponding intermediate address.)

The communications channels that are being used to and configured for accessing the memory can take any suitable and desired form. It should be noted here that the communications (memory) channels are those channels to the memory that access, either directly or indirectly, the memory storage elements themselves, and which, accordingly, may experience bottlenecks in relation to the accesses to the memory storage elements.

Thus they could, for example, be communications channels (e.g. communications buses) that directly access the storage elements in the physical memory itself (without there being any intermediate storage elements). This could be the case, where, for example, the memory (and its corresponding address space) is configured as plural separate physical (e.g. DDR) memory devices, with there being separate communications buses to each separate physical memory device.

Thus, the communications channels to the memory may, for example, be provided as respective communications buses between the physical memory devices and the units that will require access to the memory.

Alternatively, the memory channels could be in the form of (communications channels to) some form of intermediate storage whereby data may be transferred to and from the (physical) memory itself, such as a cache or caches of a cache hierarchy that is (logically) interposed between functional units that may require data from the memory and the memory itself. In this latter case therefore, the communications channels to use when accessing the memory will, in effect, and in an embodiment, comprise the intermediate storage (e.g. caches) that are to be used to access the memory, and in that case, determining the communication channel to use when accessing the memory will, and in an embodiment does, comprise determining the intermediate storage element, e.g. cache, to use when accessing the memory (for a given memory access).

In this latter case, the intermediate storage element that effectively serves as and is a communication channel to the memory in an embodiment comprises a cache, and in an embodiment a "last level cache" and/or system cache, e.g. that is (logically) located prior to the memory controller for the memory itself, and/or is the highest level cache that is shared by the functional units of the data processor for which the cache is acting. In one such embodiment, the cache is a level 2 (L2) cache, e.g. in the case where the level 2 cache is the last level cache prior to the, e.g. off chip memory system. Other arrangements would, of course, be possible.

Thus, in an embodiment, the communications channels for the memory accesses comprise respective intermediate storage elements, such as and in an embodiment, caches, that are arranged between the memory and the units that require access to the memory. Thus, there are in an embodiment a plurality of intermediate storage elements, e.g. caches, in which data from, or for storing in, the memory can be stored, each of which provides a respective channel to the memory. The intermediate storage elements in this regard may be any suitable and desired storage elements that interface between the memory and units that will require access to the memory.

Thus in an embodiment, the memory channels comprise intermediate storage elements, and in an embodiment caches, that provide an interface to the memory, and the method of the technology described herein comprises (and the apparatus of the technology described herein is correspondingly configured to and comprises circuit(s) configured to):

determining which intermediate storage element (e.g. cache (and in an embodiment which last level and/or L2 cache)) of a plurality of intermediate storage elements (e.g. caches) that have been configured for use to access a memory, to use for an access to the memory, by:

mapping a memory address associated with the memory access to an intermediate address within an intermediate address space;

selecting based on the number of intermediate storage elements (e.g. caches) configured for use to access the memory, a mapping operation to use to determine from the intermediate address which intermediate storage element (e.g. cache) of the plurality of intermediate storage elements configured for use to access the memory to use for the memory access; and using the selected mapping operation to determine from the intermediate address which intermediate storage element (e.g. cache) of the plurality of intermediate storage elements (e.g. caches) configured for use to access the memory to use for the memory access;

and using the determined intermediate storage element (e.g. cache) for the memory access.

The memory accesses that the operation in the manner of the technology described herein is used for can be any suitable and desired accesses to the memory. Thus they may be accesses to read data from the memory or accesses to write data to the memory.

Correspondingly, the data that a memory access relates to may, for example, be input data that a processing unit needs for its operation (in which case the processing unit will fetch the data via the determined memory channel for use), or data that a processing unit, for example, has generated that needs to be stored (in which case the processing unit will write the data via the determined memory channel).

Similarly, the data that is being read from or stored in the memory in this regard may be any suitable and desired data that may be stored in the memory. Thus, it could be data of an array of input data values to be processed, for example, or data of an array of output data values being generated. Thus the data could be data that is required for processing operations, such as, in the case of graphics processing, input buffers, such as vertex buffers, and output buffers, such as a frame buffer, and/or it may be control data, such as page tables for memory management, shader descriptors in graphics processing, etc. In general, the data may be any data object that is required and used in the data and/or data processing system in question (but the technology described herein will be particularly applicable to data that may have a high memory bandwidth demand (cause high memory bandwidth traffic)).

There may be more than one set of data in the memory to which memory accesses can relate, but the operation in the manner of the technology described herein can be, and is in an embodiment, performed for each and every memory access (that can proceed via the same set of memory channels), irrespective of the data or set of data that the memory access relates to.

A (the) memory access (whether to read data from or store data in the memory) will have associated with it a memory address, indicating the location in the memory that is to be accessed (where the data is to be read from or written to).

The technology described herein relates to the situation where there is a plurality of memory channels, e.g. a plurality of caches, available for accessing memory. Thus memory accesses may proceed via any one of a number of different memory channels (although for any given memory channel configuration, a given memory address (in an embodiment) can only proceed via one of the memory channels (namely the channel that it will be mapped to in accordance with the operation of the technology described herein).

In the technology described herein, in order to distribute memory accesses across the available memory channels (e.g. caches), the memory accesses are distributed between the different ones of the plurality of memory channels based on the memory addresses associated with the memory accesses, but rather than using the memory address associated with a memory access directly to determine which memory channel to use for the access in question, the memory address for the memory access is instead first mapped to a corresponding intermediate address within an intermediate address space, with the so-determined intermediate address then being used to determine which channel of the plurality of memory channels to use for the memory access in question.

In other words, the distribution of the memory accesses to the different channels is based on (determined using) intermediate addresses that the memory addresses are mapped to, rather than the memory addresses themselves.

Thus, in the technology described herein, a memory address associated with a memory access is first mapped to an intermediate address, which intermediate address is then used to determine which channel of the plurality of available memory channels should be used for that memory access.

The Applicants have recognised in this regard that a given memory access may in practice have more than one memory address associated with it during its progress, for example in the case where memory virtualisation techniques are being used. In this case, the memory access may initially use a virtual memory address, but that virtual memory address will then be converted to a "physical" memory address as part of the memory access process. There may also be more than one "layer" of virtual addresses before the conversion to the final physical address.

The memory addresses that are mapped to intermediate addresses in the technology described herein could be virtual memory addresses associated with the memory accesses (e.g. the initial virtual address associated with the memory access, and/or an intermediate virtual address associated with a memory access).

However, as the virtual address space being used may vary for any given processing operation (for example), but the physical address space supported by the memory will in general be fixed (pre-defined) and known, in an embodiment the memory addresses that are mapped to the intermediate addresses are the "physical" memory addresses associated with the memory accesses (rather than any virtual addresses that may be associated with the memory accesses).

Thus the mapping of the memory addresses to the intermediate addresses in an embodiment takes place after any translation from virtual memory addresses to physical memory addresses. Correspondingly, the address mapping circuit is in an embodiment associated with and/or (logically) after any virtual memory address to physical memory address translation circuit (e.g. translation lookaside buffer (TLB)).

The memory address mapping operation maps a memory address (within the memory address space of the memory) to a corresponding intermediate address. There will be, and is in an embodiment, a corresponding intermediate address space, comprising a set of, in an embodiment contiguous, intermediate addresses to which the memory addresses can be mapped. Thus, the mapping operation will, and in an embodiment does, map the memory address space for the memory to a corresponding intermediate address space (with each memory address in the memory address space being mapped to a given intermediate address in the intermediate address space).

It would be possible in this regard for the intermediate address space to be the same size as the memory address space, i.e. such that there will be a different intermediate address for each different memory address (there is a one to one mapping of memory addresses to intermediate addresses).

However, in an embodiment, the mapping of the memory addresses to the intermediate addresses reduces the space (range) within which the addresses are represented, i.e. the intermediate address space (number of available intermediate addresses) is smaller than the memory address space (number of possible memory addresses). This reduces the complexity of the mapping and memory channel determining operation (and required circuits), but has been found by the Applicants still to allow a suitable distribution of memory accesses among plural channels to be achieved.

Thus in an embodiment, the intermediate address space that the memory addresses are mapped to is smaller than the memory address space. For example the intermediate address space may be represented using addresses that are 5 to 12 times smaller (in terms of the number of bits) than the addresses that are used for the memory address space.

In general, the size of the intermediate address space will set the minimum granularity with which the intermediate address space (and thus the memory accesses) can be distributed between the different memory channels (and thus, for example, the relative error (and unevenness) in any distribution to the memory channels that can be achieved). Accordingly, the intermediate address space is in an embodiment set to a size (i.e. number of intermediate address bits) that should achieve a suitable distribution of the memory accesses to the different memory channels.

In an embodiment, the intermediate addresses are represented using 8 bits or fewer. In an embodiment, the intermediate addresses are represented using 6 bits. (In contrast to this, the memory addresses may be, for example, 64, 40 or 32-bit addresses, as discussed above.)

Where the intermediate address space is smaller than the memory address space, the mapping operation will, in effect, operate to compress the memory address space, and plural memory addresses will accordingly be mapped to the same intermediate address (and accordingly in an embodiment the mapping operation has that effect). Thus, in an embodiment, the mapping operation is such that the memory address space for the memory is, in effect, divided into as many sets of memory addresses as there are intermediate addresses in the intermediate address space that the mapping operation maps the memory addresses to, i.e. such that there is one set of (in an embodiment plural) memory addresses for each intermediate address (that will be mapped to that intermediate address).

In this case, in one embodiment the same number of plural memory addresses are mapped to each intermediate address. In another embodiment, the mapping is such that at least some intermediate addresses have different numbers of the memory addresses mapped to them.

In this case, each intermediate address could simply have a block of consecutive (contiguous) memory addresses mapped to it. For example, in the case where the intermediate address space is half the size of the memory address space, the first two (the lowest two) memory addresses could be mapped to the first (the lowest) intermediate address, the third and fourth (lowest) memory addresses could be mapped to the second (lowest) intermediate address, and so on.

However, in an embodiment, each intermediate address has at least some non-consecutive (non-contiguous) memory addresses mapped to it. In one embodiment, the set of memory addresses mapped to an (and in an embodiment to plural and in an embodiment to each) intermediate address comprises entirely non-contiguous memory addresses. In another embodiment, the set of memory addresses mapped to an (and in an embodiment to plural and in an embodiment to each) intermediate address comprises plural blocks of plural contiguous memory addresses, but with some or all of those blocks being non-contiguous with each other (spaced apart) in the memory address space.

Correspondingly, in one embodiment the mapping is such that the memory address space is, in effect, divided into plural (in an embodiment equal) blocks of plural contiguous memory addresses, with all the memory addresses of a given block being mapped to the same intermediate address. In another embodiment the mapping is such that the memory address space is, in effect, divided into plural (in an embodiment equal) blocks of plural contiguous memory addresses, but with all the memory addresses of a given block being mapped to different intermediate addresses. In both these cases, in an embodiment, some, and in an embodiment all, of the blocks of contiguous memory addresses that the memory address space is (in effect) divided into comprise as many memory addresses as there are intermediate addresses in the intermediate address space.

In an embodiment, the mapping of the memory addresses to the intermediate address space is based on an expected access pattern to the memory addresses in use, i.e. the expected distribution of memory address accesses when fetching data from or writing data to the memory in the data processor and/or data processing system in question.

This may be based on, for example, and in an embodiment, the order in which the memory addresses are likely to be accessed (e.g. whether it is likely to be in a linear order, or block based, or a random order, etc.), and/or the likely volume and/or rate at which different memory addresses will be accessed (e.g. whether particular memory addresses will have a higher volume and/or rate of accesses). The Applicants have recognised in this regard that it may be possible to determine a likely memory address access pattern for a given data processor/data processing system, such that an appropriate mapping of the expected memory address access pattern to an intermediate address space can be determined and based thereon.

In an embodiment, the mapping operation is also or instead, and in an embodiment also, based on, and configured for, the mapping operation that is then used to determine from the intermediate addresses which channel of the plurality of channels for accessing the memory is to be used. The Applicants have recognised in this regard that depending upon the mapping operation of the intermediate addresses to the different memory channels, a given distribution of the memory addresses in the intermediate address space may be preferable, for example, to better allow the mapping from the intermediate addresses to the memory channels to distribute the memory accesses more evenly among the plurality of memory channels.

For example, and as will be discussed further below, in the case of using a Modulo operation to map the intermediate addresses to the memory channels, an even distribution of the memory accesses to the channels will be achieved if the memory accesses are uniformly (evenly) distributed across the intermediate address space. Thus in this case it would be desirable for the mapping of the memory addresses used for the memory accesses to the intermediate addresses to be such that (expected) memory addresses being accessed are distributed evenly within the intermediate address space (even if they are not distributed evenly in the original memory address space).

Thus, in an embodiment, the mapping of the memory addresses to the intermediate addresses is so as to distribute the memory addresses (substantially) evenly across the intermediate address space.

The mapping of the memory addresses from the memory address space to intermediate addresses in the intermediate address space could be so as to preserve the relative order of the addresses in the memory address space when mapped to the intermediate address space (i.e. such that a memory address that is earlier than another memory address in the sequence of memory addresses will be mapped to an earlier intermediate address in the intermediate address space than the another memory address).

In an embodiment the mapping of the memory addresses from the memory address space to intermediate addresses in the intermediate address space distributes the memory addresses across the intermediate address space in a different order to the order of the memory addresses in the memory address space. In other words, the order of the memory addresses when represented by their mapped intermediate addresses in the intermediate address space is in an embodiment different to the order of the memory addresses in the memory address space itself.

For example, and in an embodiment, the mapping could operate to reverse the relative order for at least some of the memory addresses (i.e. such that if memory address A is before memory address B in the sequence of memory addresses, the intermediate address for memory address A is after the intermediate address for the memory address B in the sequence of intermediate addresses).

In this case, the mapping of the memory addresses to the intermediate addresses in an embodiment operates to change the relative order of some or all of the memory addresses in the memory address space when represented in the intermediate address space. Thus, in an embodiment, at least some memory addresses having a particular relative order in the memory address space are mapped to intermediate addresses in the intermediate address space whose order relative to each other in the intermediate address space differs from the relative order of the memory addresses to each other in the memory address space. The relative order could differ, for example, in terms which memory address(es) comes before another in the intermediate address space as compared to in the memory address space.

The mapping could also or instead (and in an embodiment also) change the relative spacing between memory addresses when mapped into the intermediate address space. For example, the mapping could operate to reduce (compress) the spacing between memory addresses (e.g. such that memory addresses that are more than one memory address apart are mapped to intermediate addresses that are fewer (e.g. only one) intermediate addresses apart).

In an embodiment the mapping maps the memory addresses effectively randomly into the intermediate address space (i.e. such that a sequence of memory addresses will be mapped to randomly positioned intermediate addresses in the intermediate address space).

In an embodiment the mapping operates to map a regular pattern of memory addresses in the memory address space to a different, regular or irregular, pattern of addresses in the intermediate address space In an embodiment the mapping of the memory addresses to the intermediate addresses is so as to distribute one or more particular, in an embodiment selected, in an embodiment predefined, in an embodiment regular, sequences (patterns) of memory addresses, such as every $N^{th}$ memory address, evenly across the intermediate address space.

The Applicants have recognised in this regard that memory accesses may tend to follow a particular regular pattern, e.g. based on a memory stride of the data that is being accessed (e.g. the memory address spacing of particular data elements and/or sets/groupings of data that may tend to be read or written). In this case it would be desirable to send memory accesses for, e.g. data elements, e.g. that may be read together or consecutively, to different memory channels. Mapping memory addresses at a or the "stride" spacing to different intermediate addresses and/or evenly across the intermediate address space will help to achieve this and to balance a sequence of such memory accesses across plural memory channels.

Thus, in an embodiment, the mapping operation takes account of and is based on any memory stride that is expected to be used (e.g. the granularity of the stride), i.e. where memory accesses will use or are likely to use a particular stride. This is in an embodiment done so as to (try to) distribute memory addresses having the stride spacing evenly across the intermediate address space, e.g., and in an embodiment, by the mapping mapping adjacent memory addresses at the stride spacing to different intermediate addresses.

In one such embodiment, the mapping also reduces the "stride" from the memory address space in the intermediate address space, i.e. maps a spacing between memory addresses in the memory address space to intermediate addresses having a smaller spacing between them in the intermediate address space. For example, it may convert a stride greater than one in the memory address space to a stride of one in the intermediate address space.

In one such embodiment, the mapping is so as to (at least) distribute one (regular) sequence (pattern) of memory addresses evenly across the intermediate address space, such as, and in an embodiment to (at least) distribute every $N^{th}$ memory address evenly across the intermediate address space (where N is an integer greater than one, and in an embodiment corresponds to an expected memory stride).

This is in an embodiment done by mapping each memory address of a sequence of every $N^{th}$ memory address to a different intermediate address to the previous address in the sequence. Thus the intermediate address for a given memory address in the sequence will at least differ from the intermediate addresses for its adjacent memory addresses.

In an embodiment this is done by mapping each memory address of a sequence of every $N^{th}$ memory address to a different intermediate address until all the intermediate addresses have been used and then, if necessary, mapping each memory address for the next sequence of every $N^{th}$ memory address to a different intermediate address until all the intermediate addresses have been used (and so on). In other words, when the intermediate address space comprises M intermediate addresses, then for a (and each) sequence of every $N^{th}$ memory address comprising M memory addresses, each memory address of the sequence of M every $N^{th}$ memory addresses will be mapped to a different one of the M intermediate addresses.

In these arrangements, in one embodiment the mapping of the sequences of every $N^{th}$ memory address to the intermediate addresses is the same (follows the same pattern/order) for each sequence of every $N^{th}$ memory address (for example every $N^{th}$ memory address could be mapped to the next intermediate address in the sequence of intermediate addresses (with the intermediate address sequence repeating (returning to the beginning) (wrapping around) once all the intermediate addresses have been used).

In another embodiment the mapping of the sequences of every $N^{th}$ memory address to the intermediate addresses is different for different sequences of every $N^{th}$ memory address. In an embodiment, the mapping of the memory addresses to the intermediate addresses is different (uses a different pattern/order) (at least) for adjacent sequences of every $N^{th}$ memory address (changes for each new sequence of every $N^{th}$ memory address). Thus the memory addresses of a first sequence of every $N^{th}$ memory address will be mapped in turn to the intermediate addresses in a first sequence (order) of the intermediate addresses, and another (and in an embodiment the next) sequence of every $N^{th}$ memory address will be mapped in turn to the intermediate addresses in a different sequence (order) of the intermediate addresses (and so on).

The mapping could operate to distribute only one regular sequence of memory addresses evenly across the intermediate address space, but in an embodiment the mapping is so as to distribute more than one regular sequence of memory addresses evenly across the intermediate address space. In this case therefore, the mapping will not only distribute every $N^{th}$ memory address evenly across the intermediate address space, but also distribute every $L^{th}$ memory address evenly across the intermediate address space (where N and L are both integers greater than one and are not equal to each other) (and so on, if desired).

Again, this is in an embodiment done by mapping every $N^{th}$ memory address to the intermediate addresses in the manner discussed above, and correspondingly mapping every $L^{th}$ memory address to the intermediate addresses in the manner discussed above (and so on for further sequences of memory addresses if desired). In this case, the mapping of the sequences of every $N^{th}$ (and every $L^{th}$, etc.) memory address to the intermediate addresses in an embodiment changes for different sequences of every $N^{th}$ memory address (as discussed above).

In one such embodiment, the memory addresses of every block of a particular number of (contiguous) memory addresses (in an embodiment corresponding to the number of intermediate addresses in the intermediate address space) are mapped to respective different intermediate addresses, but with consecutive (adjacent) blocks of the particular number of memory addresses being mapped to the intermediate addresses in a different sequence (pattern/order) of the intermediate addresses.

Thus, for example, where the intermediate address space comprises M intermediate addresses, in an embodiment the memory address space is divided into respective blocks of M memory addresses, and each memory address of a given block of M memory addresses is mapped to a different intermediate address to the other memory addresses of the block, with adjacent blocks of M memory addresses being mapped to the M intermediate addresses in different orders (patterns) to each other (i.e. such that the order in which the intermediate addresses are mapped to the memory addresses of the blocks is different for adjacent blocks of M memory addresses).

Where the mapping distributes plural regular sequences of memory addresses evenly across the intermediate address space, then in one embodiment the plural regular sequences of memory addresses comprise sequences of memory addresses that are spaced by a power of 2 (so, for example, a sequence of every $2^{nd}$ memory address, a sequence of every $4^{th}$ memory address, a sequence of every $8^{th}$ memory address (if desired), and so on (if desired)). In this case, the mapping in an embodiment uses a hash comprising a diagonal matrix to map the memory addresses to the intermediate addresses.

In an embodiment the mapping is so as to distribute both power of 2 and non-power of 2 sequences of memory addresses evenly in the intermediate address space. In this case, the mapping in an embodiment uses a polynomial hash of the form $x^2+x+1$ to map the memory addresses to the intermediate addresses.

In an embodiment, the mapping also or instead maps all the memory addresses of a respective block of plural contiguous memory addresses in the memory address space to the same intermediate address. This will then have the effect that all the memory addresses in the block will proceed via the same memory channel. This may be useful, for example, where it is expected that particular blocks of memory addresses will likely or always be accessed together, and/or where a given memory channel more effectively accesses and/or is configured to access a set of plural adjacent memory addresses together, as in these cases, it may then be more efficient for the desired block of plural memory addresses to (always) proceed via the same memory channel.

Thus, for example, where the memory system and/or memory access pattern is so as to access N memory addresses together (where N is an integer greater than 1), each memory address of a set of N adjacent memory addresses may in an embodiment be mapped to the same intermediate address, to thereby trigger the use of the same memory channel for each of the N adjacent memory addresses.

This will in an embodiment done for each of plural such blocks of memory addresses that the memory space may be (and is) divided into, i.e. such that the memory space will be divided into plural blocks of (N) plural addresses, with all the (N) addresses of a given block being mapped to the same intermediate address.

In this case, different blocks should be, and are in an embodiment, mapped to different intermediate addresses. In an embodiment, the mapping operates to map the memory addresses for adjacent blocks of memory addresses to different intermediate addresses, such that memory accesses to those adjacent blocks of memory addresses will (tend to) proceed via different memory channels. For example, N adjacent memory addresses may be mapped to one intermediate address, but with the adjacent N memory addresses then being mapped to a different intermediate address (that will trigger the use of a different memory channel for those N memory addresses). This may help to distribute the memory accesses more evenly across the memory channels.

In this case, the respective blocks of N memory addresses are in an embodiment mapped to the intermediate addresses in one of the manners discussed above in relation to mapping (individual) memory addresses to the intermediate addresses. Thus each block of N memory addresses can effectively be considered to correspond to "one" memory address in the above mapping arrangements, so the mappings applied to the blocks in a corresponding manner (to map blocks of plural memory addresses to the intermediate address space).

Thus, for example, where the intermediate address space comprises M intermediate addresses, for a sequence of M blocks each of N (contiguous) memory addresses, each memory address of a given block of N memory addresses is mapped to the same intermediate address (i.e. such that all the N memory addresses in the block are mapped to the same intermediate address), and the M blocks of N memory addresses in the sequence are each mapped to a different one of the M intermediate addresses (and so on for further sequences of blocks, if present).

In this case, again, consecutive sequences of blocks of N memory addresses may be mapped to the intermediate addresses in the same order (pattern) of the M intermediate addresses, or the order in which the intermediate addresses are mapped to the blocks may vary from block sequence to block sequence (e.g. to (try to) provide an even distribution for more than one stride value). For example, a polynomial hash may be used to map the intermediate addresses to the blocks of memory addresses (as discussed above), e.g. where it is desired to support the use of different strides to access the memory.

The mapping operation in an embodiment also takes account of any (re-)distribution of memory accesses that may take place within an individual memory channel, for example where memory accesses via the channel may be further divided into respective "sub-channels" within the overall "channel". This would be the case, for example, where the memory channel includes a cache, and the cache is divided into multiple sets, such that certain memory addresses go to a particular set only.

The Applicants have recognised that in such cases, it would be desirable for the memory accesses to the channel in question to still be evenly distributed across the respective sub-channels (e.g. cache sets) (so far as possible) (and conversely for the mapping to the intermediate addresses to not result in all the memory accesses that use the channel in question being distributed to the same sub-channel of the memory channel (e.g. set of the cache)).

Thus, in an embodiment, the mapping of the memory addresses to the intermediate addresses is such that the memory accesses will be distributed more evenly, and as far as possible, evenly across any sub-channels supported by an individual memory channel (and will not, for example, or in an embodiment, be exclusively to or predominantly to only one sub-channel, e.g. set of the cache in question). This is in an embodiment achieved by configuring the memory address to intermediate address mapping to not be incompatible with, and in an embodiment to be orthogonal to, any other mapping (distribution function) that may be applied to distribute the accesses in the memory channels.

As will be appreciated from the above, the Applicants have found that in general the following different mappings of memory addresses to intermediate addresses are particularly beneficial, and thus in an embodiment, the mapping of the memory addresses to the intermediate addresses does one or more of the following:

it operates to randomise the distribution of the memory addresses in the memory space across (in) the intermediate address space (e.g. maps the memory addresses randomly to the intermediate addresses);

it maps all the memory addresses for a sequence of a particular, in an embodiment selected, in an embodiment predetermined, plural number of plural adjacent memory addresses to the same intermediate address;

it maps adjacent sequences of a particular, in an embodiment selected, in an embodiment predetermined, plural number of adjacent memory addresses to different intermediate addresses;

it operates to distribute one or more regular sequences of memory addresses evenly across the intermediate address space;

it maps every memory address of a sequence of every $N^{th}$ memory address to a different intermediate address until all the intermediate addresses have been used and then, if necessary, maps every memory address for a next sequence of every $N^{th}$ memory address to a different intermediate address until all the intermediate addresses have been used (and so on); map a block of plural adjacent memory addresses to the same intermediate address;

it maps each memory address of a block of plural adjacent memory addresses to different intermediate addresses;

it maps the memory addresses of adjacent blocks of plural memory addresses to the same set of plural different intermediate addresses, but with the memory addresses for the different blocks being mapped to the intermediate addresses in a different pattern of the intermediate addresses; and it maps the memory addresses of every block of a particular number of (contiguous) memory addresses (in an embodiment corresponding to the number of intermediate addresses in the intermediate address space) to respective different intermediate addresses, but with consecutive (adjacent) blocks of the particular number of memory addresses being mapped to the intermediate addresses in a different sequence (pattern/order) of the intermediate addresses.

The mapping operation to use, and the way that the mapping operation modifies the distribution of the memory addresses when mapped to the intermediate addresses can be determined and selected in any suitable and desired manner. For example, and in an embodiment, this may be based on an analysis of the expected and/or observed memory transactions for the data processor/data processing system in question. In an embodiment, suitable analysis, such as benchmarking, of the memory accesses for the data processor/data processing system in question is used to determine the mapping operation to use.

For example, and in an embodiment, appropriate analysis across plural sets of data and/or processing operations may be used to identify, for example, an expected "average" memory address access distribution and pattern, e.g. for plural sets of data and/or plural processing operations that may be used, with the mapping operation then being selected based on, for example, an appropriate "average" expected memory address access pattern and distribution across the plural sets of data and/or processing operations that are being considered. For example, memory access traces/patterns from commonly used benchmarks, and/or typical, e.g. graphics, applications, such as games, user interface, virtual reality and compute applications could be used/analysed for this.

In one embodiment, a single memory address to intermediate address mapping operation is used for all sets of data and processing operations for which mapping from a memory address to an intermediate address in the manner of the technology described herein is to be performed. This will then simplify any implementation of the technology described herein, as a given data processor/data processing system will only need to be configured to support and perform one (and the same) single memory address to intermediate address mapping operation, when that is required.

In another embodiment, plural different mapping operations are supported, with the mapping operation to be used able to be set in use, for example, and in an embodiment, by programming the memory channel determining circuit accordingly (e.g. by setting appropriate control registers for that circuit).

In this case, the selection and setting of the mapping operation to use may be done, for example, and in an embodiment, by a driver for the data processor in question, and/or by an application that requires processing by the data processor. The selection and setting of different mapping operations may be based, for example, on the particular workload and/or content in question. For example, in the case of a graphics processor at least, a different mapping operation may be used for rendering workloads as compared to compute workloads (compute shading workloads). Other arrangements would, of course, be possible.

It should be noted here, that while the memory address to intermediate address mapping operation is in an embodiment based on the expected "memory traffic", it does not need to be, and in an embodiment is not, based on the number of memory channels that may be used. Thus the mapping is in an embodiment independent of the number of memory channels (and, where selected, selected without reference to the number of memory channels being used) (and the, or the selected, mapping is used irrespective of the number of memory channels being used).

The mapping operation to map a memory address to an intermediate address can be performed in any suitable and desired manner. In an embodiment, this is done as a hash operation (using a hash function) to map the memory addresses to the intermediate addresses.

In one such embodiment, a set of plural hash vectors are applied to the memory address to thereby generate the corresponding intermediate address. In an embodiment, there is one hash vector per bit in the intermediate address, with that hash vector being respectively applied to and used on the memory address to derive the bit of the intermediate address that the hash vector corresponds to. Thus, for example, where the intermediate addresses are 6 bit values, there will be six hash vectors, one for each intermediate address bit, which are respectively applied to the memory address in question to derive the corresponding intermediate address bit value.

The hash vectors that are used in this regard are in an embodiment set so as to achieve the desired redistribution of the memory addresses within the intermediate address space, and may, for example, and in an embodiment, and as discussed above, be derived based on analysis (benchmarking) of observed and/or expected memory address access patterns and distributions for the data processor and/or data processing system in question.

In this case, there may, for example, be a single set of hash vectors that is always used, or there may be plural different sets of hash vectors (e.g. with each set of hash vectors providing a different "redistribution" into the intermediate address space), with the set of hash vectors to use being selected and set in use (e.g., and in an embodiment, on the basis discussed above).

The hash vectors can be applied to the memory addresses in any suitable and desired manner. In an embodiment, a combination of a logical AND operation and a logical XOR (exclusive OR) operation is used. In an embodiment, the hash vector is ANDed with the memory address, with the resulting bits then being XORed together to provide the corresponding output bit value for the corresponding intermediate address bit position. This will be done for each bit position in the intermediate address, to then provide the intermediate address that the memory address in question is to be mapped to.

Performing the hash operation using a combination of AND and XOR operations in this manner is a particularly effective and efficient mechanism for performing that operation, and that can be relatively simply and cheaply implemented in hardware.

Other arrangements would, of course, be possible.

As discussed above, in one embodiment there is in an embodiment a single set of hash vectors that is used in this regard, which hash vectors are used for any and all memory addresses for which mapping to an intermediate address is required. It would alternatively be possible to have different sets of hash vectors (e.g. for use with different sets of data and/or for different processing operations), if desired. In that case, it is in an embodiment only the hashing vectors that change, with the hash operation (e.g. the AND followed by XOR) remaining the same in all cases.

Once the memory address associated with the memory access has been mapped to an intermediate address, then that intermediate address is used to determine which memory channel of the plurality of memory channels should be used for the memory access in question. To do this, firstly a mapping operation to be used to determine from the intermediate address the channel to use for the memory access is selected based on the number of channels allocated for accessing the memory. The so-selected mapping operation is then used to determine from the intermediate address which channel to use for the memory access.

It should accordingly be noted in this regard that, in contrast to the mapping of the memory addresses to the intermediate addresses, the mapping of the intermediate addresses to the memory channels is dependent upon the number of channels that are being used (whereas the mapping of the memory addresses to the intermediate addresses is independent of, and does not depend on, the number of channels that are in use).

To allow for the mapping of the intermediate addresses to the channels to be dependent upon the number of channels being used, in an embodiment, there is a plurality of different intermediate address to memory channel mapping operations available and that can be used, with each such mapping operation being intended to be used for a given number or numbers of memory channels.

In this case, there could, for example, be respective mapping operations for different subsets of the possible numbers of channels that could be available, such as one mapping operation in the case where there is an even number of channels and a different mapping to use in the case where there is an odd number of channels.

In an embodiment, there is a different intermediate address to memory channel mapping operation for each different number of channels that there could be provided for use to access the memory. Thus, in the case where up to eight channels can be configured for use to access the memory, there will in an embodiment be eight different intermediate address to channel mapping operations, the one to use of which will be selected in accordance with the number of channels being used.

It would be possible in this regard for each different intermediate address to channel mapping operation to be a distinctly different operation, but in an embodiment all the intermediate address to memory channel mapping operations use the same type of mapping operation to map the intermediate addresses to the channels, but with that mapping operation being modified in dependence upon the number of channels being used, e.g., and in an embodiment, by setting an appropriate (control) parameter for the mapping operation in dependence upon and in accordance with the number of channels being used.

In an embodiment, the intermediate address to memory channel mapping operation uses a Modulo operation (i.e. determines the channel to use by determining, and based on, the remainder when the intermediate address is divided by a (selected) divisor), with the divisor value for the Modulo operation being set based on, and in an embodiment equal to, the number of channels being used. Thus, if there are N memory channels being used, numbered 1 to N, Modulo N of the intermediate address will be taken and used to determine which channel of the N channels to use.

Using a Modulo operation to distribute the intermediate addresses between the different memory channels is a particularly efficient and simple operation to implement, and can, for example, readily be used both for even and odd numbers of channels. Moreover, where, as discussed above, the mapping of the memory addresses to the intermediate addresses is so as to distribute the (expected) memory accesses evenly across the intermediate address range, then using a Modulo operation to map the intermediate addresses to the memory channels (e.g. caches) will correspondingly have the effect of (more) evenly distributing the memory accesses across whatever number of memory channels are being used.

Thus, in an embodiment, the mapping operation that maps the memory addresses to the intermediate addresses is so as to distribute the (expected) memory addresses being accessed more evenly across the intermediate address space as compared to their distribution within the memory address space, and the mapping of the intermediate addresses to the memory channels uses a modulo N operation, where N is the number of memory channels being used.

Other arrangements would, of course, be possible. For example, other forms of hash operation, instead of a Modulo operation, could be used to distribute the intermediate addresses between the different memory channels, if desired.

Correspondingly, in order to implement the intermediate address to channel mapping operation, the memory channel mapping circuit in an embodiment includes a plurality of intermediate address to memory channel mapping circuits, such as, and in an embodiment, a plurality of Modulo circuits, with the intermediate address to channel mapping circuit to use for the mapping operation then being selected based on the number of channels. The selection in this regard could operate to activate and use the selected intermediate address to channel mapping circuit only, or the intermediate address could, for example, be input to and processed by each (all) of the intermediate address to channel mapping circuits in parallel, but then with the output of the desired intermediate address to mapping circuit (only) being selected as the mapping to use.

The number of memory channels being used (to thereby select the intermediate address to channel mapping operation to use) can be determined and indicated in any suitable and desired manner. In an embodiment, this is in an embodiment provided as an appropriate control parameter to the memory channel mapping circuit, for example by setting a configuration register (e.g. by a driver for the data processor in question), setting configuration pins for the circuit, or as metadata (e.g. provided in a descriptor) that the memory channel mapping circuit/operation can extract. Other arrangements would, of course, be possible.

Once the memory channel to use for the memory access has been determined from the intermediate address, then the so-determined memory channel will be used for the memory access. As discussed, this may comprise reading data at the memory address via the determined memory channel, and/or writing data at the memory address via the determined memory channel. Depending on the configuration of the memory channel(s), this may comprise, as discussed above, reading or writing the data from or to the memory directly, and/or reading or writing the data from or to some form of intermediate storage, such as, and in an embodiment, a cache. This will be done for each memory access that the operation in the manner of the technology described herein is to be used for.

A memory access can be caused to use the determined channel in any suitable and desired manner. This is in an embodiment done by configuring the operation such that the access is routed to (and via) the determined channel (e.g. cache). This may be, and is in an embodiment, done in accordance with the routing mechanism (protocol) for the data processor and data processing system in question. For example, the determined channel (index) may be fed into the routing table, which then sets the, e.g. appropriate header, for the access (message) such that it will be routed via the desired memory channel.

As discussed above, the memory accesses may relate to any and all accesses that may be made to the memory. Equally, a memory access may be initiated by and relate to any suitable and desired unit, element, component, etc., of a data processor and data processing system that may have need to access memory, such as an execution unit that is performing a data processing operation (such as a processing core (e.g. a shader core in a graphics processor), a memory management unit that requires memory address translation data, a tiler in a graphics processor, etc. In general the operation in the manner of the technology described herein may be used for any DMA agent.

In the case of a graphics processor at least, the memory accesses may, and in an embodiment do, comprise, for example, reading input textures and writing pixels to a framebuffer in the fragment processing, and/or reading and writing vertices and attributes in the vertex processing.

As discussed above, the technology described herein relates to the situation in which the number of memory channels being used can be varied.

Thus, the method of the technology described herein in an embodiment further comprises configuring a set of one or more communications channels for use to access a memory, and the apparatus of the in an embodiment further comprises a memory channel configuration circuit operable to configure a set of one or more of a plurality of communications channels for accessing memory. In an embodiment the configured number of memory channels is then provided to the memory channel determining process/circuit, with the operation then proceeding in the manner of the technology described herein when memory accesses are made.

The varying numbers of memory channels that are able to be allocated for use to access the memory can be provided in any suitable and desired manner.

In an embodiment, there is, in effect, a pool of plural communications channels (e.g. L2 caches) that can be made available for accessing the memory, and some or all of those channels are configured for accessing the memory (which allocation can be varied over time).

There may be any suitable and desired number of channels in the "pool". In an embodiment, there are from 4 to 64 channels, e.g. 8, 16 or 32 channels, that can be allocated for accessing the memory. In an embodiment different numbers of channels from the "pool" can be allocated for accessing the memory at different times. It could be possible to allocate any number of the channels, or only certain numbers (combinations) of channels could be permitted.

The number of memory channels (from the pool) to be available for accesses to the memory at a given time can be set in any suitable and desired manner. This is in an embodiment done by configuring a (configurable) communications network to enable the desired number of memory channels as being able to be used to access the memory (for example to set the number of (appropriate) caches that a functional unit can use to access the memory). Other arrangements would, of course, be possible.

In an embodiment, any configuring of the number of available memory channels is able to be done at (and done at) one or both of boot-up and/or runtime, with that configuration then in an embodiment being used until the configuration is appropriately reset.

The technology described herein is in an embodiment implemented in a data processing system that includes at least one data processor that includes one or more functional units that will require access to memory, together with the relevant "pool" of memory channels for use by the functional units.

Thus, a further embodiment of the technology described herein comprises a data processing system comprising (and the technology described herein correspondingly extends to a corresponding method of operating such a data processing system):

one or more data processors;
a plurality of communications channels (e.g., and in an embodiment, caches) for accessing a memory;
a memory channel configuration circuit operable to configure a set of one or more of the plurality of communications channels for accessing the memory; and
one or more memory channel determining circuits, each memory channel determining circuit:
configured to determine which communications channel of a set of one or more of the plurality of communications channels that have been configured for accessing the memory to use for an access to the memory;
and comprising:
an address mapping circuit configured to map a memory address associated with a memory access to an intermediate address within an intermediate address space; and
a memory channel mapping circuit configured to:
select based on the number of communications channels configured for use to access the memory, a mapping operation to use to determine from the intermediate address which channel of the set of one or more channels configured for use to access the memory to use for the memory access; and
use the selected mapping operation to determine from the intermediate address which channel of the set of one or more channels configured for use to access the memory to use for the memory access.

Correspondingly, a further embodiment of the technology described herein comprises a data processor comprising (and the technology described herein correspondingly extends to a method of operating such a data processor):

one or more communications channels (e.g., and in an embodiment, caches) for accessing a memory; and
one or more memory channel determining circuits, each memory channel determining circuit:
configured to determine which communications channel of a set of one or more of a plurality of communications channels that have been configured for accessing a memory to use for an access to the memory;
and comprising:
an address mapping circuit configured to map a memory address associated with a memory access to an intermediate address within an intermediate address space; and
a memory channel mapping circuit configured to:
select based on the number of communications channels configured for use to access the memory, a mapping operation to use to determine from the intermediate address which channel of the set of one or more channels configured for use to access the memory to use for the memory access; and
use the selected mapping operation to determine from the intermediate address which channel of the set of one or more channels configured for use to access the memory to use for the memory access.

As will be appreciated by those skilled in the art, these embodiments of the technology described herein can, and in an embodiment do, include any one or more or all of the features of the technology described herein described herein, as appropriate.

The data processor(s) and/or data processing system will also (in an embodiment) include one or more processing circuits operable to cause a memory access to proceed via the determined memory channel.

There may be a single data processor only (in which case the memory channels (the pool of channels), e.g. caches, will all be part of the same, single data processor) (and in one embodiment that is the case).

In an embodiment, there is a plurality of data processors, with some, and in an embodiment plural, and in an embodiment all, of the data processors then being operable in the manner of the technology described herein. In this case the "pool" of communications channels (e.g. caches) for accessing the memory in an embodiment include communications channels on different ones of the plural data processors, i.e. such that the memory channels that are available to a functional unit of a given data processor (can) include channels that are provided via another data processor or processors other than the data processor itself. In one such embodiment, the memory channels that are available to a given data processor comprise both a channel or channels of the data processor itself, and one or more channels that are on (via) another data processor or processors other than the data processor itself.

For example, and in an embodiment, each processor of plural processors may include a (e.g. L2) cache, which can be configured to act as a memory channel both for that processor and for other processors of the system (when desired).

The data processor(s) can be any suitable and desired data processor(s). In general the technology described herein can be used for and with any data processor that utilises multiple memory channels (e.g. caches or access channels to memory). Thus it or they may, for example, be a central processing unit(s) (CPU) or a neural (network) processor(s) (neural processing unit (NPU)). In an embodiment, the data processor(s) is a graphics processor (a graphics processing unit (GPU)).

Where there are plural data processors, in an embodiment each data processor is a processor of the same type (e.g. all the processors are GPUs), although the functionality and resources of the processors may differ from each other.

A (and each) processor will include one or more, and in an embodiment plural, functional units, some or all of which will need to access (and access) memory.

The functional units of the data processor(s) in an embodiment comprise one or more of, in an embodiment plural of, and in an embodiment all of the following types of functional unit: one or more execution units (execution cores) (shader cores in the case of a graphics processor), in an embodiment that are or include programmable processing circuits operable to execute programs to perform data processing operations; a management unit (e.g. a job manager) that provides a host processor (or virtual machine) (software) interface for the data processor (and is in an embodiment also operable to divide a data processing task allocated to the data processor into subtasks and to distribute the subtasks for execution to the execution unit or units of the data processor); a cache (e.g. an L2 cache) that provides a communications channel (an interface) to an external (main) system memory (of the data processing system).

The data processors may also comprise other functional units, depending upon the purpose of the processing units. For example, a tile-based graphics processor may also include a tiling unit (a tiler).

In an embodiment, at least some of the functional units include an address translation cache (such as a translation lookaside buffer). The data processor in that case in an embodiment also comprises a memory management unit (MMU) (however, appropriate memory management units could also or instead be located externally to the data processor(s), if desired). In an embodiment, each address translation cache has associated with it a memory channel determining circuit of the technology described herein, so that once the address translation cache has determined the physical address associated with a memory access, the corresponding memory channel for the access can be (and is) determined.

In an embodiment, some or all, and in an embodiment each, of the functional units that will require memory accesses include a corresponding memory channel determining circuit of the technology described herein, so that the corresponding memory channel to use for a memory access for the functional unit in question can be (and is) determined. Thus in an embodiment, each execution unit (processing core (e.g. shader core in the case of a graphics processor)) includes and/or has associated with it, a memory channel determining circuit of the technology described herein, as does each memory management unit. Other functional units may also have memory channel determining circuits as appropriate. For example, in the case of a tile-based graphics processor, the tiler of the graphics processor may also, and in an embodiment does also, include or have associated with it, a memory channel determining circuit.

It would also be possible for a memory channel determination circuit to be shared between (plural) different functional units, if desired. In general the memory channel determination (and circuit) should be, and is in an embodiment, configured to happen before the memory transaction is laid on a channel, but otherwise can be located as desired.

Each data processor in an embodiment comprises an internal communications network for routing communications between the functional units of the data processor. These internal communications networks can be provided as desired, but in an embodiment are provided as an, in an embodiment message based, interconnect using switches. The routing of the internal communications networks (the interconnect) can in an embodiment be reconfigured in use, e.g., in order to enable and disable respective memory channels for the data processor. This is in an embodiment done by appropriately configuring the switches in the internal communications network.

Other configurations of data processor would, of course, be possible.

In an embodiment, there are plural data processors (the data processing system includes plural data processors) that are configurable as different, respective partitions of the data processors, with each partition comprising a set of one or more of the data processors of the plurality of data processors (and, in an embodiment, being able to be independently (and respectively) allocated, e.g. to a (different) virtual machine (at any given time), and/or being operable to generate a data processing output independently of any other set (partition) of one or more data processors of the plurality of data processors).

In this case, a given partition of data processors can in an embodiment comprise a single data processor only (in which case the data processor will operate on its own, in a "standalone" mode), or plural data processors that can operate together to provide processing, e.g. to a virtual machine that is using that partition of the data processors. In the latter case, the plural data processors of the set (partition) in an embodiment operate in a "master-slave"-type arrangement, with one data processor of the set (partition) operating as a master (primary) data processor controlling processing operations on one or more other data processor(s) of the set (partition) that are each acting as a slave (secondary) data processor.

In this case, the data processing system may comprise any desired and suitable plural number of data processors. In an embodiment, there are four or eight data processors, but the data processing system may comprise more or fewer data processors, as desired.

In this case, at least some, and in an embodiment all, of the plurality of data processors include one or more memory communication channels (e.g., and in an embodiment, in the form of a cache or caches), with the data processors of a partition of the data processors in an embodiment then being configurable to use the memory channels of the data processor(s) of the partition.

Thus, a respective partition of plural data processors may therefore, and typically will, include a corresponding set of plural memory channels (e.g. caches), with at least some of the memory channels (e.g. caches) in the set of plural memory channels (e.g. caches) residing on different data processors within the partition. In general, each respective partition of plural data processors may have a different set of plural memory channels that is made up of the memory channels (e.g. caches) from the data processors within the partition, with different partitions therefore potentially including different numbers of memory channels (e.g. caches), e.g. determined by the data processors within the partition.

For example, and in an embodiment, a partition of two data processors will have two memory channels (e.g. caches) available to the functional units of the data processors, a partition of three data processors will have three memory channels (caches) available to the functional units of the data processors, and so on.

In this case therefore, the configuring of the data processors into respective partitions (sets) will, and in an embodiment does, correspondingly configure the number of memory channels (e.g., and in an embodiment, caches) available to the data processors of the partition (and thus changing the configuration of the partitions will correspondingly change the number of memory channels being used by a given data processor).

Correspondingly, the method of the technology described herein in an embodiment comprises (and the apparatus, data processor, and data processing system of the technology described herein in an embodiment comprises an appropriate circuit or circuits configured to) configuring a set of one or more communications channels for use to access a memory, by configuring one or more processors of a plurality of data processors into a partition of the data processors that is operable independently of other data processors of the plurality of data processors.

In order to allow the data processors to be configured into respective partitions of the data processors, the data processors are in an embodiment connected to each other, in an embodiment in series (in a daisy chain), via respective communication bridges (such that data processors connected by a communication bridge can communicate with each other), which communications bridges can be selectively enabled and disabled in use, to thereby allow the data processors to be configured into respective partitions of the data processors.

In the present embodiments, the data processors can be configured as the desired subsets (partitions) (linked sets) of the data processors in any suitable and desired manner. In an embodiment, this is done by appropriately setting the internal communications networks of the data processors, and the ability (or otherwise) of the data processor(s) to communicate with other data processor(s) via the communications bridges (so as to allow communication relevant to the required operating mode for the data processor or processors of the subset (partition) in question (and to prevent communication that would be inappropriate for the operating mode in question and/or appropriate for another operating mode)).

This may be done, for example, and in an embodiment, by setting one or more switches controlling the internal communications network(s) of the data processor(s) and/or the communication bridges to other data processors of the plurality of data processors appropriately.

As well as the configuring the appropriate communications for the data processors to form the desired subsets (partitions) of the data processors, the configuration of the data processors into the desired subsets (partitions) may, and in an embodiment does, also comprise configuring the operation of the data processors appropriately as well (e.g. for standalone, master or slave operation, as appropriate).

The data processors are in an embodiment configured into the desired sets (partitions) of the data processors by a controller of the data processing system. That controller can take any suitable and desired form. It is in an embodiment an appropriate software controller of the data processing system, e.g. and in an embodiment, that is executing on an appropriate processor, such as a CPU, of the data processing system (and that is separate to the data processors themselves).

In an embodiment, the controller is a controller that is also operable to control access to the (partitions of the) data processor(s), e.g. by virtual machines that require processing operations by the data processor(s).

The controller can operate to configure the data processors into the respective partitions (sets) of data processor(s) in any suitable and desired manner.

In an embodiment, the data processors have an associated management circuit that is operable to configure the data processors into different partitions (sets) (under the control of the controller) (e.g., and in an embodiment, by appropriately setting the internal communication networks of the data processors, and the ability (or otherwise) of the data processor(s) to communicate with other data processor(s) via the communications bridges), and the controller correspondingly controls the data processor management circuit to allocate and configure the data processors into the desired partitions (sets) of the data processor(s).

The controller can control the management circuit to perform the desired configuration of the partitions (sets) of data processor(s), etc., in any suitable and desired manner. In an embodiment, the management circuit includes an independent, e.g., and in an embodiment, only accessible by suitable software, configuration interface that is accessible to (and in an embodiment only accessible to) the controller for this purpose. This interface may comprise, for example, a set of configuration registers for setting parameters to control the management circuit to configure the data processors.

In an embodiment, the partitions (sets) of data processor (s) can be reconfigured in use, for example in response to some event that may be detected and conveyed to the data processing system and the controller. In this case, a given data processor and/or partitions (set) of data processors is in an embodiment reset and/or powered off (and then restarted) when it is reconfigured.

As well as the data processors, communications bridges, etc., necessary for operation in the manner of the these embodiments, the data processing system may otherwise include any other suitable and desired components, elements, units, etc., that a data processing system may comprise.

Thus, in an embodiment, the data processing system includes the data processors, and one or more host data processors (processors) (e.g. central processing units) on which one or more virtual machines and/or applications that are to use the data processors execute, in an embodiment together with one or more drivers for the data processors. As discussed above, one or more of the host processors in an embodiment also executes a controller that is operable to partition the data processors into subsets of the data processors, and/or that is operable to control access to data processors (and in an embodiment to the partitions of the data processors) by respective virtual machines/applications.

In an embodiment, the data processing system and/or data processors comprise, and/or are in communication with, one or more memories and/or memory devices, that are accessed in the manner of the technology described herein, and, e.g., that store the data described herein, and/or that store software for performing the processes described herein.

The data processing system may also include one or more peripheral devices, such as one or more output devices (e.g. display screens, vehicle controllers, etc.), and/or one or more input devices (e.g. human-computer interfaces, vehicle sensors, etc.).

The technology described herein can be used for all forms of output that a data processor (and data processing system) may be used to generate. For example, in the case of graphics processing, the graphics processor may generate frames for display, render to texture outputs, etc. The output data values from the processing are in an embodiment exported to the memory, for storage and use, such as to a frame buffer for a display.

The technology described herein is applicable to any suitable form or configuration of data processor and data processing system. In an embodiment, the various functions of the technology described herein are carried out on a single data processing platform that generates and outputs data. In one embodiment, the various functions of the technology described herein are carried out on a single system on chip (SoC) data processing system.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various circuitry, functional elements, stages, and "means" of the technology described herein may comprise a suitable processor or processors, controller or controllers, functional units, circuits, circuitry, processing logic, microprocessor arrangements, etc., that are operable to perform the various functions, etc., such as appropriately dedicated hardware elements (processing circuits) and/or programmable hardware elements (processing circuits) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits, etc., if desired.

Subject to any hardware necessary to carry out the specific functions discussed above, the data processing system and processor can otherwise include any one or more or all of the usual functional units, etc., that data processing systems and processors include.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on one or more data processors, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a processor, renderer or microprocessor system comprising data processor causes in conjunction with said data processor said processor, renderer or microprocessor system to carry out the steps of the methods of the technology described herein. Such a computer software carrier could be a non-transitory physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

A number of embodiments of the technology described herein will now be described.

As discussed above, the technology described herein relates to the operation of data processing systems in which there may be plural independent memory channels made available to functional units, such as execution cores, for accessing memory, and in which the number of memory channels that are made available to a functional unit, such as a processing core, can be varied in use.

FIGS. 1-10 show schematically the operation of the embodiments of the technology described herein in this regard. FIGS. 11-14 show in more detail an exemplary data processing system in which embodiments of the technology described herein may be implemented and used.

FIG. 1 shows schematically an exemplarily data processing system 100 that includes, inter alia, a plurality of processing cores 101 (in the present example there are 16 processing cores), each of which can communicate with cache banks 102 of a respective set of cache banks 102 (in this case 8 cache banks) that can be made available to the processing cores 101. As shown in FIG. 1, each cache bank effectively provides a respective, and independent, communication channel (memory channel) to an external memory 103.

In this system, it is assumed that each processing core 101 can access each cache bank 102, with each cache bank serving as a channel to the external memory 103 and providing the cores 101 with cache capacity and memory bandwidth resources.

It will be appreciated in this regard, that FIG. 1 simply shows schematically the components and elements, etc., of the data processing system that are necessary for illustrating the operation of the embodiments of the technology described herein. There will be further components, elements, etc., in the data processing system that are not illustrated in FIG. 1.

The present embodiments relate in particular to the situation when different numbers of the cache banks 102 can be allocated to respective processing cores 101 to thereby act as channels to the external memory 103 for those processing cores. In particular, the processing cores and cache banks can be organised as respective partitions within the data processing system, with each partition comprising a respective subset of the processing cores that then share a respective subset of the cache banks.

Figure 2:
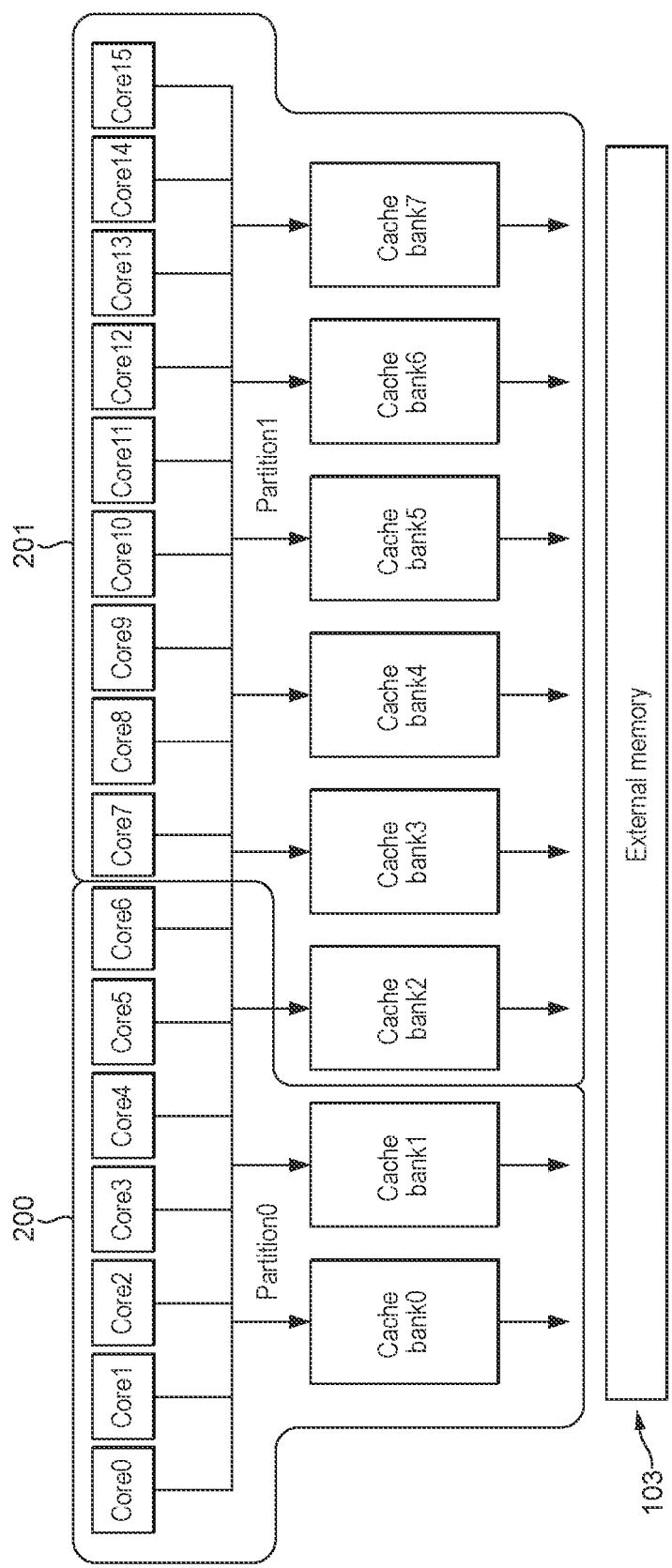
FIGS. 2 and 3 show schematically further details of the data processing system of FIG. 1.
Figure 3:
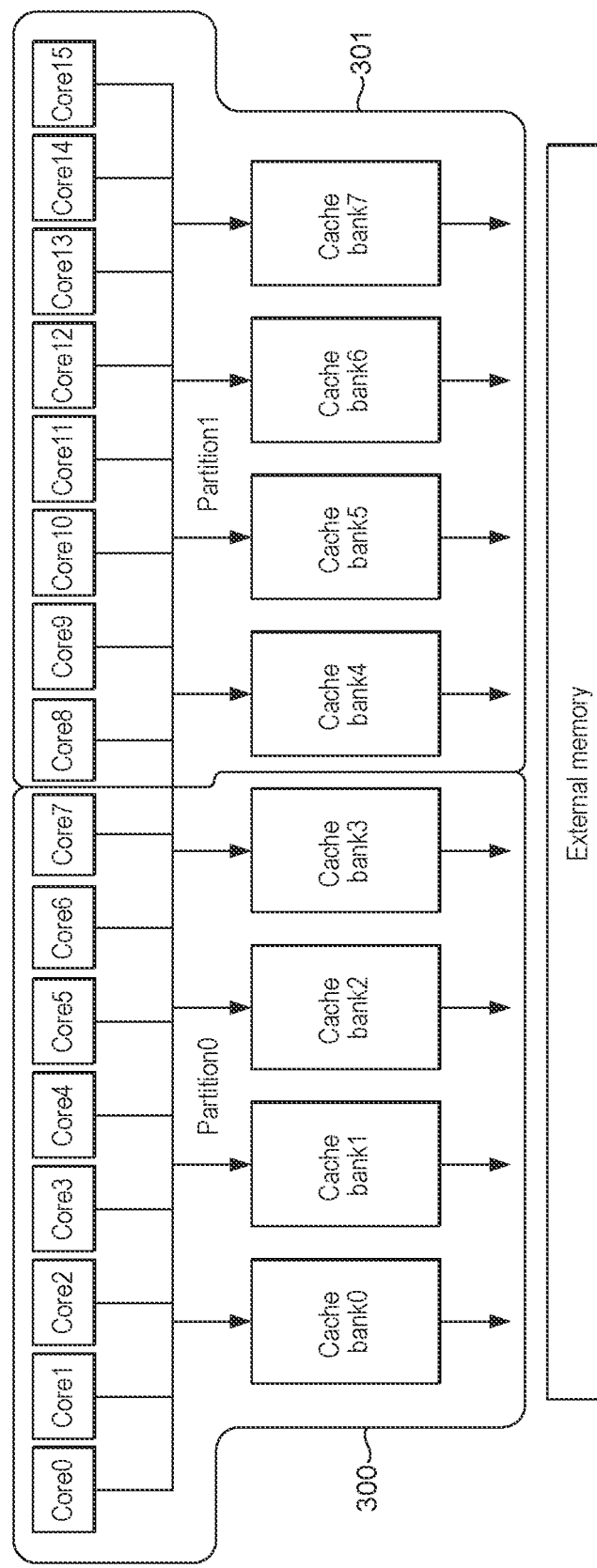

FIGS. 2 and 3 illustrate exemplary subdivisions of the processing cores and cache banks of the data processing system shown in FIG. 1 into such respective partitions. FIG. 2 shows a subdivision into two partitions, a first partition 200 that contains 7 processing cores and 2 cache banks, and a second partition 201 that contains 9 processing cores and 6 cache banks. FIG. 3 shows a subdivision of the data processing system into two partitions 300, 301 each containing 8 cores and 4 cache banks.

It should be noted that although FIGS. 2 and 3 shows subdivision of the processing cores 101 and cache banks 102 into two partitions only, other configurations of partition would be possible if desired, such as there being three or more partitions.

In these arrangements, each partition will be configured as a symmetric multiprocessing (SMP) system, i.e. such that cache banks (memory channels) in a partition are symmetrical to all the processing cores in the partition, and each core in a partition has access to all the cache banks in the partition and effectively sees all the cache banks as a "single" cache.

Figure 4:
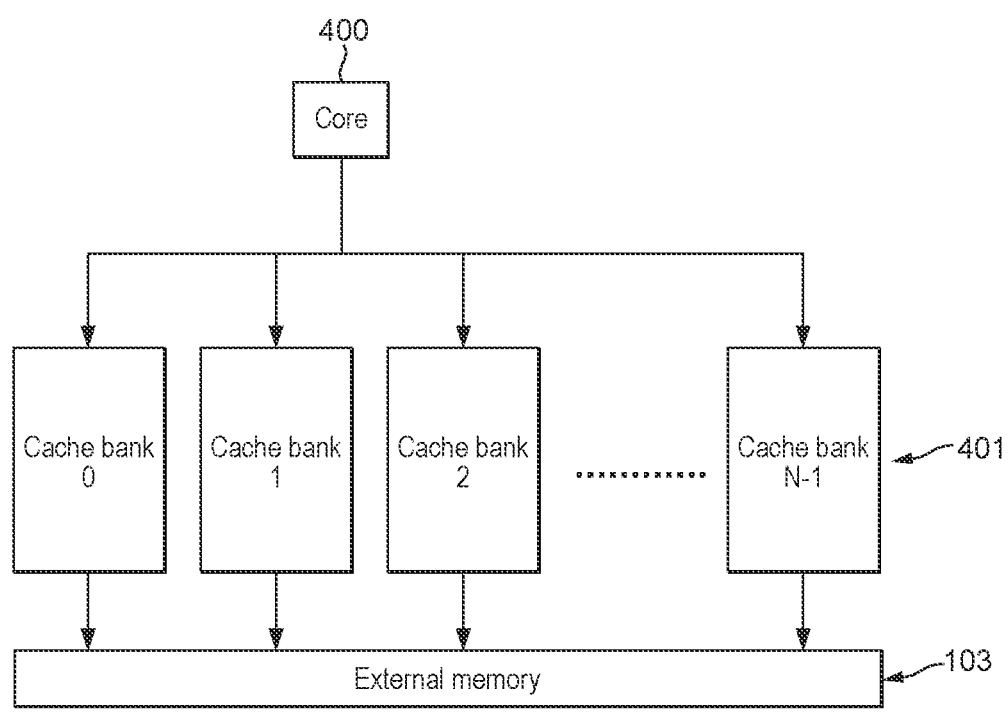
FIG. 4 shows schematically embodiments of the data processing system of FIGS. 1, 2 and 3.

As each partition is a symmetrical multiprocessing system, each core can be considered to be able to be configured to have a varying number of N memory channels (cache banks) with N varying from 1 to N, where N is the maximum number of cache banks that can be made available to the core (so 8 in the examples shown in FIGS. 1, 2 and 3). FIG. 4 illustrates this and shows an exemplary core 400 able to be allocated up to N cache banks 401 (depending on the configuration of the partition the core is in).

In the present embodiment, in order to distribute memory accesses to the external memory 103 by a (and each) processing core in a partition between the cache banks made available to that partition, the memory accesses are distributed to the cache banks (the memory channels) based on the memory address associated with the memory accesses. However, rather than determining the cache bank (memory channel) to use from the memory address directly, the memory address is first mapped (converted) to an intermediate address in an intermediate address space, with the intermediate addresses then being used to determine which cache bank (memory channel) to use. This provides an address-based and static address distribution scheme (thereby helping to maintain cache coherence and memory consistency), but which the Applicants have found will provide better performance in a data processing system where the number of memory channels (in this embodiment cache banks) available to a processing core can vary, and in a manner which is relatively simple and efficient to implement.

Figure 5:
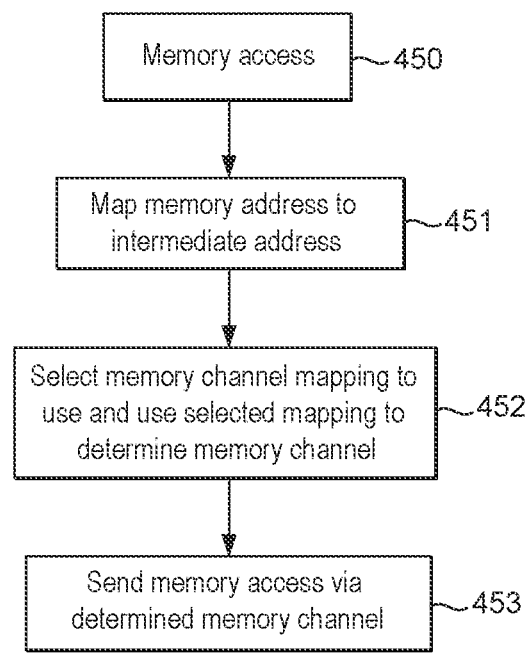
FIG. 5 shows the operation in an embodiment of the technology described herein.

FIG. 5 shows the operation in the present embodiment when mapping a memory address to a respective cache bank (memory channel).

As shown in FIG. 5, a processing core will initiate a memory access (step 450). The memory access in this regard may, for example, be to read data from the memory, or it may be to write data to the memory.

The memory access will have a memory address associated with it, indicating the memory location to which the access applies.

This memory address will be a memory address within a memory address space supported by the memory and that can be represented by the address size (address width) of the addresses used for memory accesses. For example, memory accesses may be associated with 64, 40 or 32 bit addresses.

As shown in FIG. 5, in the present embodiments, the memory address associated with the memory access is first mapped to an intermediate address within an intermediate address space (step 451). This mapping is independent of the number of memory channels (cache banks) that are available to the processing core that has made the memory access, so the same memory address to intermediate address mapping is used for all memory accesses, irrespective of the number of memory channels (cache banks) that may be in use.

In the present embodiment, the memory addresses that are mapped to the intermediate addresses are the physical memory addresses associated with the memory accesses. Thus the memory address for a memory access is mapped to an appropriate intermediate address after any virtual address to physical address translation of the address associated with the memory access has been performed. Other arrangements, such as mapping virtual addresses associated with memory accesses to intermediate addresses would be possible, if desired.

The intermediate address to which the memory address for the memory access is mapped comprises, in the present embodiment, an intermediate address within a smaller intermediate address space than the memory address space. Thus the intermediate addresses will have a smaller size (width) than the memory addresses. For example, the intermediate addresses may be 6 bit addresses.

In the present embodiments, the mapping of the memory addresses to the intermediate addresses is configured so as to distribute the (expected) memory addresses being accessed in the data processing system more evenly within the intermediate address space than the accesses are distributed within the memory address space. This is so as to facilitate, as will be discussed in more detail below, the use of a Modulo operation to then distribute to the intermediate addresses across the different cache banks (memory channels).

In the present embodiments, this is achieved by the mapping operation mapping the memory addresses to the intermediate addresses in such a manner as to randomise the distribution of the memory addresses in the intermediate address space. As will be discussed further below, this is achieved by performing a hash operation on the memory addresses using hash vectors that have the effect of randomly distributing the memory addresses across the intermediate address space. These hash vectors are determined based on an analysis of observed and/or expected memory access traffic for the data processing system in question, so as to derive suitable hash vectors and a hash operation that will distribute the expected and/or observed memory access pattern more evenly within the intermediate address space.

Other arrangements and other forms of mapping of the memory addresses to intermediate addresses could be used, if desired.

Once the memory address associated with a memory access has been mapped to an intermediate address, the memory channel to use is then determined using the intermediate address. To do this, an intermediate address to memory channel mapping to use is first selected (set) based on the number of memory channels (in this case cache banks) in use, with that selected mapping then being used to determine the memory channel (cache bank) to use for the memory access (step 452).

In the present embodiments, the intermediate address to the memory channel mapping operation uses a Modulo operation, with the divisor for the Modulo operation being set equal to the number of memory channels (cache banks). Thus the intermediate address will be subjected to a Modulo N operation, where N is the number of memory channels available to the processing core in question, with the remainder from the Modulo operation then indicating the memory channel to be used for the memory access (with the memory channels being assumed to be numbered from 1 to N).

Thus the Modulo operation to use to determine which memory channel to use is selected and set based on the number of memory channels that are in use for the processing core, and then that Modulo operation is performed on the intermediate address to determine which memory channel to use for the memory access.

Once the memory channel (in this case the cache bank) to be used for the memory access has been determined, then the memory access proceeds via the determined memory channel (step 453). This is achieved in the present embodiments by configuring the operation such that the access is routed to (and via) the determined channel, using, and in accordance with, the routing mechanism (protocol) for the data processor and data processing system in question. In particular, the determined channel (index) is fed into the routing table, which then sets the appropriate header for the access (message) such that it will be routed via the desired memory channel. Other arrangements would, of course, be possible.

Figure 6:
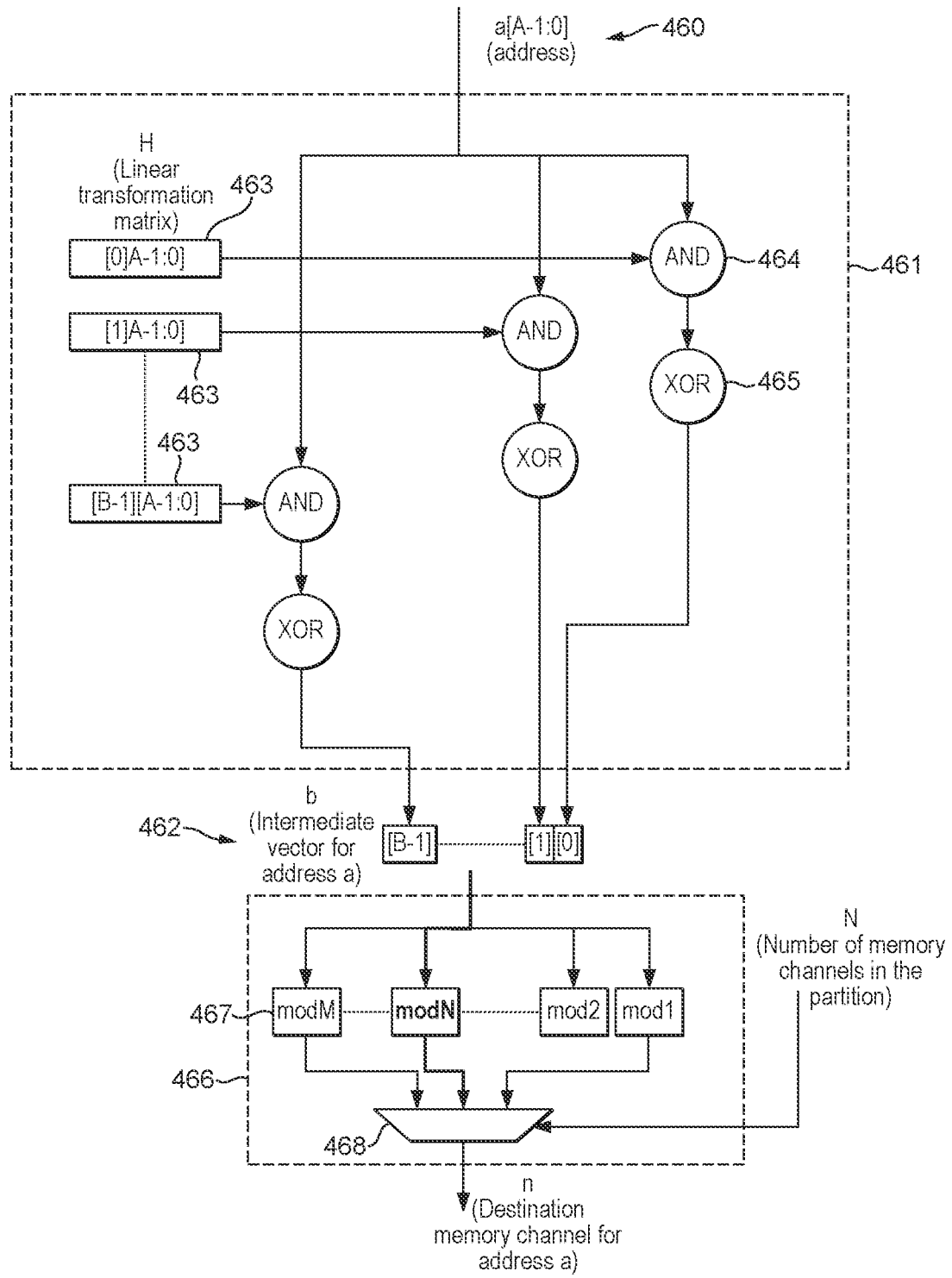
FIG. 6 shows in more detail embodiments of the operation shown in FIG. 5.

FIG. 6 shows the operation of mapping a memory address to an intermediate address and determining the memory channel to use from the intermediate address in the present embodiments in more detail.

As shown in FIG. 6, for an A-bit memory address a 460, that address is first subjected to a hash operation by an address mapping circuit 461 (which is in the form of a hash circuit) to generate from the memory address 460 the corresponding mapped, intermediate address b 462, which in this example is assumed to be a B-bit address (e.g. a 6 bit address).

As shown in FIG. 6, the hash operation operates to apply a respective set of hash vectors 463, one for each bit in the intermediate address 462, to the memory address 460. In particular, as shown in FIG. 6, there is a respective hash vector for each bit of the intermediate address, and that hash vector is first ANDed 464 with the memory address 460 and then the result of the AND operation XORed 465 to thereby provide an output bit which is the value of the bit in question in the intermediate address 462. Thus in the case of a 6-bit intermediate address 462, there will be 6 hash vectors 463, which will be applied to the memory address 460 to generate the corresponding 6 bits of the intermediate address 462.

This operation, in effect, applies a linear transformation matrix (a matrix multiplication) to the memory address 460 to thereby generate the corresponding, mapped intermediate address 462.

The hash vectors used for the memory address to intermediate address mapping may be determined, for example, from analysis of expected and/or observed memory access patterns and traffic in the data processing system in question, and should be set such as to achieve the desired mapping of the memory addresses into the intermediate address space based on that analysis.

As shown in FIG. 6, the so-determined intermediate address 462 is then input to a set of intermediate address to memory channel mapping circuits 466, which in the present embodiment are in the form of a set of Modulo circuits 467 which respectively determine the remainder when the intermediate address is divided by the divisor for the Modulo circuit in question (i.e. perform a Modulo operation of the intermediate address 462). As shown in FIG. 6, there are M Modulo circuits, where M is the maximum number of memory channels (cache banks) that can be made available to a processing core.

As shown in FIG. 6, the Modulo result for the number of memory channels (in this case cache banks) N currently being used is then selected 468 as indicating the memory channel (cache bank) to be used for the memory address 460.

As discussed above, the present embodiments use a memory address to intermediate address mapping that, in effect, randomises the distribution of the memory addresses in the intermediate address space, as that then provides a more even distribution of the memory accesses in the intermediate address space, which will then work more efficiently and better with the Modulo operation for distributing the intermediate addresses to the memory channels.

The combined effect of the memory address to intermediate address mapping and Modulo operation is to distribute the memory traffic from the cores for a partition (more) evenly between the cache banks (memory channels) of the partition, thereby achieving better memory channel utilisation and accordingly better overall system performance.

FIGS. 7 to 10 show exemplary mappings of memory addresses from a memory address space into an intermediate address space that have the effect of distributing the memory addresses evenly in the intermediate address space that may be used in embodiments of the technology described herein. These exemplary mappings show for clarity mapping a 32-address memory address space to a 4-address intermediate address space. Much larger memory address and intermediate address spaces would, of course, be possible, and the mappings illustrated in FIGS. 7 to 10 would operate in a corresponding manner in other sizes of address space.

Figure 7:
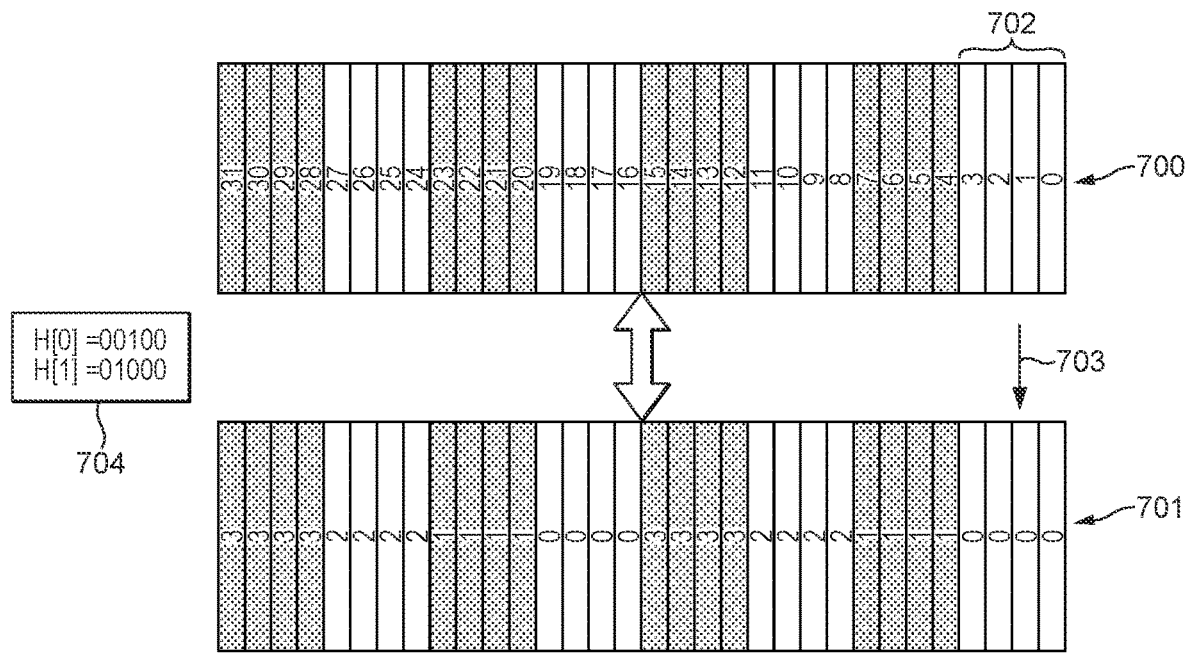
FIGS. 7, 8, 9 and 10 show memory address to intermediate address mappings used in embodiments of the technology described herein.

FIG. 7 shows a first exemplary mapping of the (32) memory addresses 700 to the (4) intermediate addresses 701. In this case, every block 702 of a particular number of the memory addresses (in this case every block of 4 memory addresses) is mapped to the same intermediate address 703 (thus the memory addresses 0-3 are all mapped to intermediate address 0, for example), with consecutive blocks of (4) memory addresses being mapped to consecutive intermediate addresses in the sequence of intermediate addresses (and the intermediate address sequence repeating (returning to the beginning) (wrapping around) when the highest intermediate address is reached).

FIG. 7 also shows the corresponding hash vectors (matrix) 704 that achieve this mapping when applied to the memory addresses in the manner of the present embodiments.

This mapping will be particularly useful where the memory access patterns tend to read memory addresses using a stride corresponding to the memory address "block" size (i.e. tend to read in succession addresses that are spaced apart by a stride corresponding to the memory address "block" size), and/or the memory system supports reading a particular number of memory addresses in parallel (in the same cycle).

As the memory address "block" size in FIG. 7 is four memory addresses, the mapping shown in FIG. 7 is accordingly particularly suitable for arrangements that will (tend to) use a stride of 4 memory addresses, and/or that can read 4 memory addresses in parallel. In particular, as can be seen from FIG. 7, when reading every fourth memory address (a stride of 4), the memory accesses will be distributed evenly across the intermediate address space. Correspondingly, blocks of four consecutive memory addresses will map to the same intermediate address (and thus use the same memory channel).

Similar arrangements can be used for other memory address "block" sizes, e.g. where a different stride is expected to be used.

Figure 8:
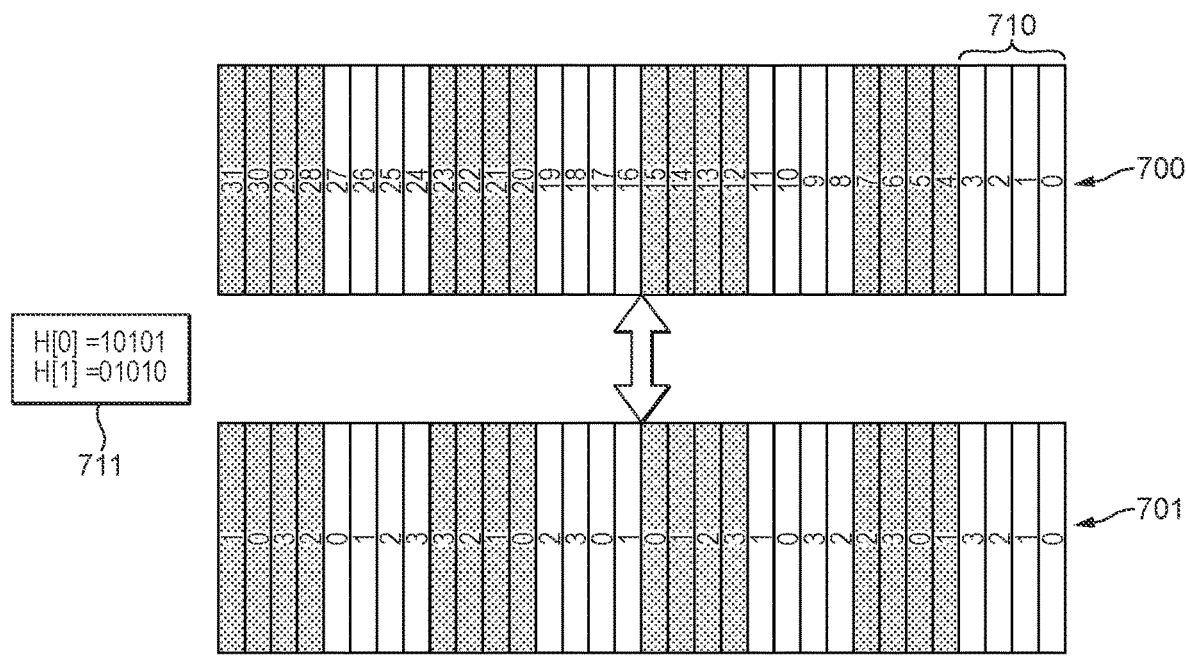

FIG. 8 shows a second exemplary mapping of the memory addresses 700 to the intermediate addresses 701. In this case, the memory addresses of every block 710 of a particular number of the memory addresses (in an embodiment corresponding to the number of intermediate addresses in the intermediate address space—thus in this case every block of 4 memory addresses) are mapped to respective different intermediate addresses (thus the memory addresses 0-3 are mapped respectively to intermediate addresses 0-3, for example), but with consecutive (adjacent) blocks of (4) memory addresses being mapped to the intermediate addresses in a different sequence of the intermediate addresses (thus the memory addresses 4-7 are mapped respectively to intermediate addresses 1, 0, 3, 2 for example).

In this case therefore, at least some (and most) blocks of the particular number of consecutive memory addresses will be mapped to the intermediate addresses such that they have a different order in the intermediate address space to the order of the addresses in the memory address space (and with different blocks of memory addresses being mapped in different orders to the intermediate address space). Thus for at least some of the memory addresses, their order when mapped to the intermediate addresses will be different to their order in the memory address space.

FIG. 8 also shows the corresponding hash vectors (matrix) 711 (which in this case will be a diagonal matrix) that achieve this mapping when applied to the memory addresses in the manner of the present embodiments.

This mapping has been found to be particularly useful where the memory access patterns tend to read memory addresses using a power of 2 stride (e.g. a stride of 2, 4 or 8), as it will distribute the memory addresses being read in such sequences evenly across the intermediate address space.

Figure 9:
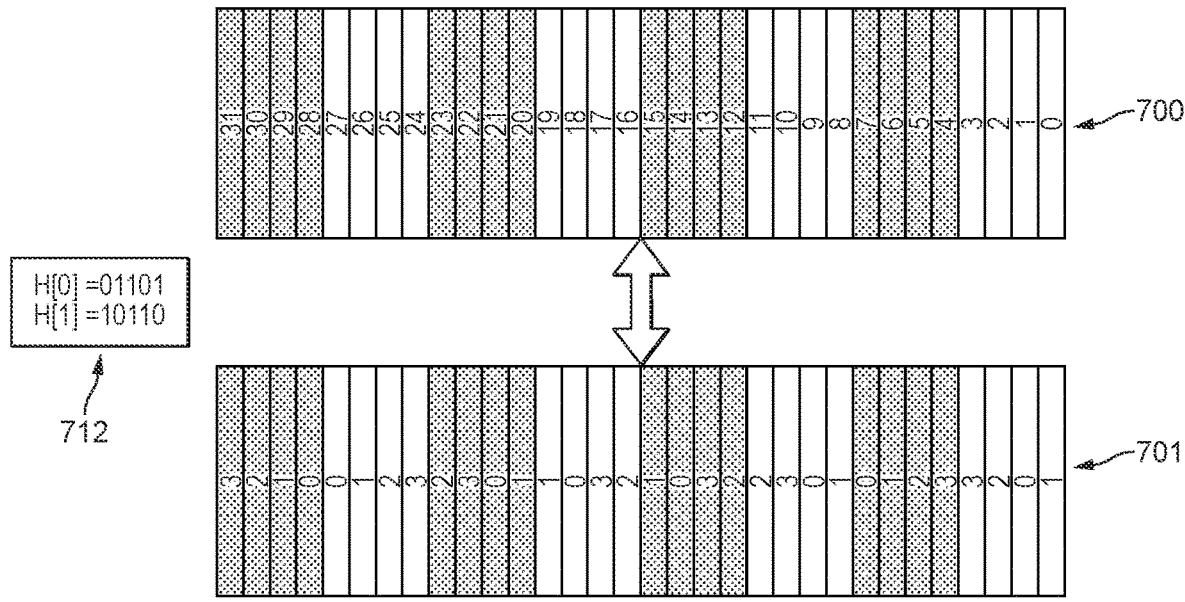

FIG. 9 shows a further exemplary mapping of the memory addresses 700 to the intermediate addresses 701, which is similar to the mapping shown in FIG. 8, in that the memory addresses of every block of a particular number of the memory addresses (again, in an embodiment corresponding to the number of intermediate addresses in the intermediate address space—thus in this case every block of 4 memory addresses) are mapped to respective different intermediate addresses (thus the memory addresses 0-3 are mapped respectively to intermediate addresses 0-3, for example), and with consecutive (adjacent) blocks of (4) memory addresses being mapped to the intermediate addresses in a different sequence of the intermediate addresses, but with the sequences of intermediate addresses varying in a different manner to that shown in FIG. 8 (thus in FIG. 9 the memory addresses 4-7 are mapped respectively to intermediate addresses 3, 2, 1, 0, for example).

This mapping uses a polynomial hash of the form $x^2+x+1$, corresponding to the hash vectors 712 shown in FIG. 9, and has been found to be particularly useful both where the memory access patterns tend to read memory addresses using a power of 2 stride (e.g. a stride of 2, 4 or 8), and for non-power of 2 strides (e.g. a stride of 3, 5, 6, or 7) (as it will tend to distribute the memory addresses being read in all such cases evenly across the intermediate address space).

Figure 10:
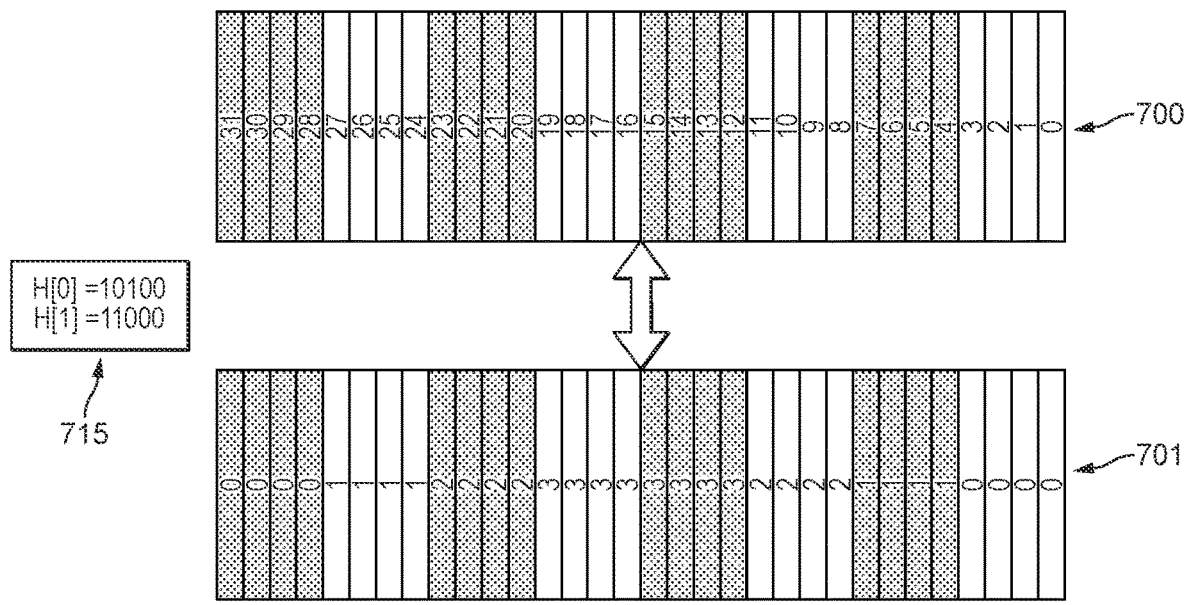

FIG. 10 shows a mapping that uses the mapping pattern of FIG. 9 (so a polynomial hash), but applied to respective blocks of plural (in this case 4) memory addresses (so that plural (4) consecutive memory addresses are all mapped to the same intermediate address, but the consecutive blocks of plural (4) memory addresses are mapped to the intermediate addresses in the same pattern as the individual addresses are in FIG. 9). Thus, in this case, the sequence of blocks of plural (4) memory addresses will be mapped to the intermediate addresses in the same pattern as the individual memory addresses are mapped to the intermediate addresses in the mapping of FIG. 9.

As can be seen from the corresponding hash vectors (matrix) 715 for this mapping shown in FIG. 10, this mapping essentially uses the hash vectors (matrix) from FIG. 9 but shifted two places to the left.

This mapping may be useful where the memory system reads plural (in this case four) consecutive addresses together, as discussed above (and it is desired to support the use of different strides to access the memory).

FIGS. 11 to 14 show an embodiment of a data processing system in which the embodiments of the technology described herein may be implemented, in this case, in the form of an automotive system-on-chip (SoC).

Figure 11:
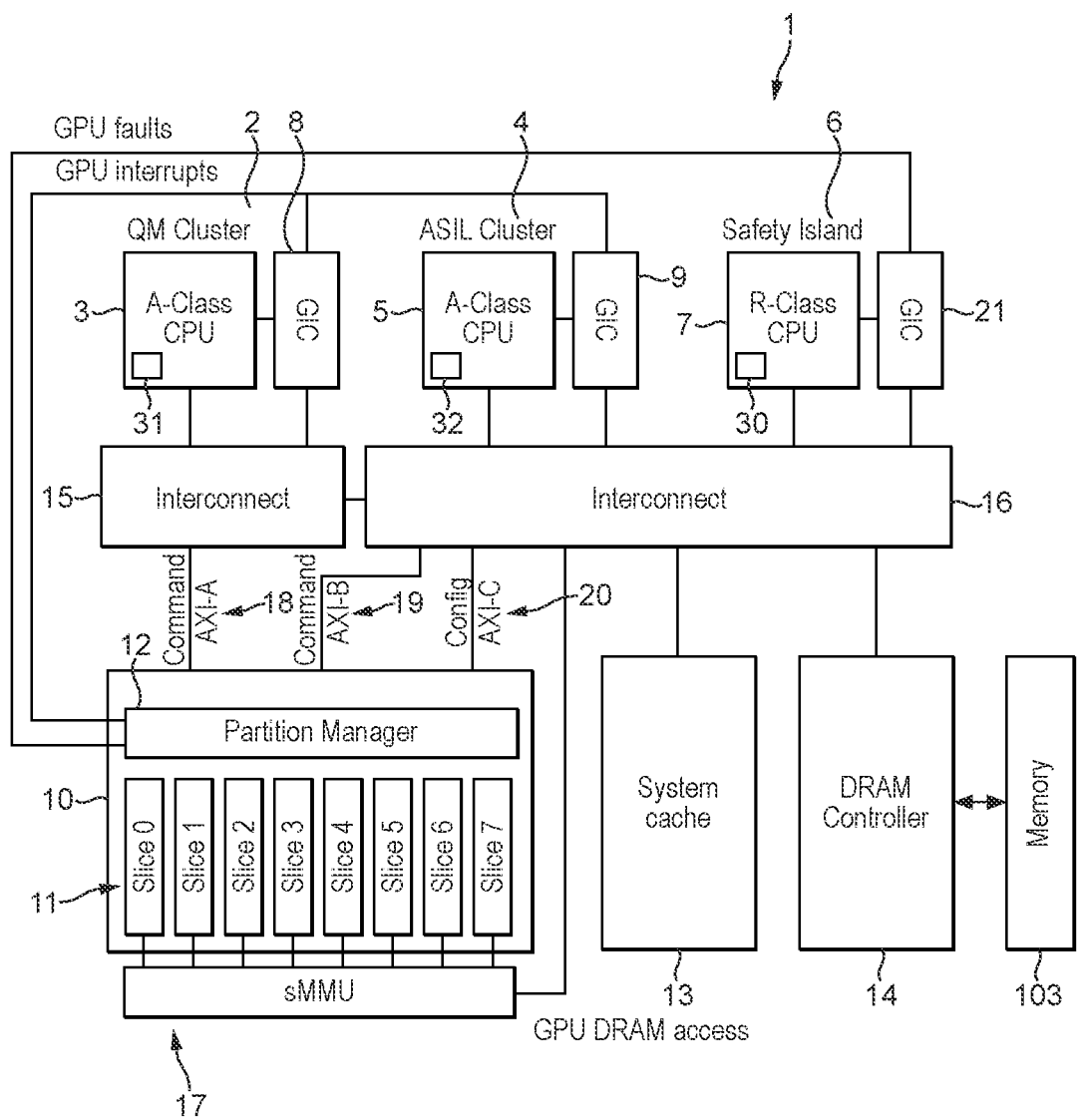
FIG. 11 shows schematically a data processing system in which the present embodiment may be implemented.

FIG. 11 shows an embodiment of a data processing system in the form of an automotive system-on-chip (SoC).

As shown in FIG. 11, the data processing system 1 of this embodiment comprises three CPU (central processing unit) clusters: a first "quality managed" (QM) cluster 2, comprising a CPU 3 running "quality managed" software (thus the CPU 3 does not have automotive safety features); a second, "ASIL" (automotive safety integrity level) (functional safety, FuSa) cluster 4, comprising a CPU 5, but this time running appropriately safety certified software; and a "safety island" cluster 6, comprising a CPU 7 that runs safety certified software for configuration of the system and fault handling.

As shown in FIG. 11, each CPU cluster also comprises its own general interrupt controller (GIC) 8, 9, 21.

As well as the CPU clusters, the system also comprises a "graphics processing" cluster 10, comprising a set 11 of graphics processing units (graphics processors) ("slices"), that are able, as will be discussed further below, to provide processing functions to virtual machines executing on the QM cluster 2 and the ASIL cluster 4.

In this example, the set 11 of graphics processing units comprises eight graphics processing units (slices 0-7, where each slice is a graphics processing unit of the set), but other numbers of graphics processing units would, of course, be possible. As will be discussed further below, in this embodiment the graphics processing units (GPUs) can be operated in various modes, namely either as "standalone" GPUs, or as one or more linked sets of a primary (master) and one or more secondary (slave) GPUs.

The graphics processing units 11 also have associated with them (as part of the graphics processing cluster 10), a management circuit (partition manager) 12.

As shown in FIG. 11, the system supports three separate communications bus connections for the graphics processing cluster 10: a first communications bus 18 that may be used, for example, for non-safety critical traffic and thus by the QM cluster 2; a second bus 19 that may be a safety-critical/secure bus and used, for example, for safety critical traffic and thus by the ASIL cluster 4; and a third bus 20 that may be a safety-critical/secure bus but that also has privilege restrictions (i.e. can only be accessed by appropriately privileged bus masters) and that is used for configuration communications only by the safety island 6.

The system also includes an appropriate system cache 13, DRAM controller 14, interconnects 15, 16, external memory 103, and a system memory management unit (sMMU) 17 (that, e.g., provides second level address translation separating safe and non-safe address spaces and isolates the memory access for each virtual machine based on the per-access window stream IDs) for the graphics processing cluster 10.

There may, of course, be functional units, processors, system elements and components etc., that are not shown in FIG. 10.

The management circuit (partition manager) 12 for the graphics processing units 11 is operable to configure and set a configurable communications network that sets the communications paths between the different graphics processing units (slices) 11, and also how the (and which) graphics processing units communicate with the QM cluster 2 and the ASIL cluster 4 (and in particular which of the buses 18, 19, can be used to communicate with the respective graphics processing units). In particular, it can set that communications network to configure the graphics processing units (slices) 11 into, in this embodiment, two different groups of the graphics processing units, one group for the QM cluster 2 (and coupled to the bus 18 for that cluster), and one group for the ASIL cluster 4 (and coupled to the bus 19 for that cluster).

As well as being able to set the configurable communications network to subdivide the graphics processing units into different groups, the management circuit (partition manager) also supports and can configure the organisation of the graphics processing units of a group into one or more independently allocatable partitions (subsets) of the graphics processing units (slices) of the group.

The management circuit (partition manager) 12 also provides a set of "access windows" in the form of communications interfaces whereby a virtual machine may access and control a given partition of the graphics processing units. Each such access window comprises, in the present embodiments, a set of (communication) registers having a corresponding set of physical addresses that can be used to address those registers.

These access windows also provide the mechanism whereby a virtual machine may communicate with an arbiter (with the arbiter for the group of graphics processing units that the virtual machine is to used), and in particular provide a mechanism for a virtual machine and arbiter to exchange messages, for example in relation to the virtual machine requesting processing resources, and the arbiter controlling access of the virtual machine to the (partitions of) processing units, for example to signal when the access window is enabled to use a partition, and/or when the virtual machine is to relinquish its use of a partition, e.g. so as to permit a different virtual machine to access the partition. The virtual machine-arbiter interface is separate to the virtual machine-graphics processing unit partition interface.

Thus, the graphics processing cluster 10 effectively provides a set of graphics processing resources, comprising the graphics processing units (slices) 11, and the partitions and access windows supported by the management circuit 12, which resources can be subdivided into plural (in the present embodiment two) graphics processing resource "groups", each containing one or more of the graphics processing units (slices) and having associated with them one or more of the independently allocatable partitions of the graphics processing units and one or more "access windows".

In the present embodiment, the management circuit (partition manager) 12 supports the subdivision of the graphics processing units 11 into two different groups (one for use by the QM cluster 2, and the other for use by the ASIL cluster 4), into a maximum of four partitions, and provides a set of 16 access windows for virtual machines to communicate with the partitions of the graphics processing units. Other arrangements would, of course, be possible.

In the present embodiments, the configuration of these graphics processing resources into the respective groups is done by the management circuit (partition manager) 12 under the control of a (privileged) controller 30 executing on the safety island 6, and respective arbiters 31, 32 executing on the QM cluster 2 and the ASIL cluster 4.

To support this operation, the management circuit (partition manager) 12 further comprises appropriate configuration interfaces, e.g., and in an embodiment, in the form of appropriate sets of configuration registers, that can be respectively accessed and set by the controller 30 on the safety island 6 and the arbiters 31, 32 on the CPU clusters. The controller and arbiters can correspondingly set their configuration registers accordingly, to thereby control the management circuit (partition manager) 12 to configure the graphics processing resources (and in particular the configurable communications network that configures the graphics processing resources) accordingly. The management circuit (partition manager) 12 may also include one or more state machines for this purpose.

The arbiters 31, 32 are operable to control access by virtual machines executing on the respective clusters to the corresponding graphics processing resource group that has been allocated to that cluster. Each arbiter may operate in association with a corresponding hypervisor for managing the operation of virtual machines that are executing on the cluster in question (but is separate to the hypervisor).

The controller 30 is able to assign to each "resource group" that it configures, one or more graphics processing units of the set of graphics processing units 10, one or more of the partitions that the partition manager 11 supports, and one or more of the access windows that the partition manager supports. Each group is also assigned to a respective one of the "cluster" communication buses 18 and 19, in dependence upon whether the group is to be used by the QM cluster 2 (in which case it will be assigned to the corresponding QM cluster bus 18) or by the ASIL cluster 4 (in which case it will be assigned to the ASIL bus 19).

In order to configure the respective groups of graphics processing resources that are to be made available to the QM cluster 2 and ASIL cluster 4, the controller 30 on the safety island 6 sets appropriate configuration parameters in the (privilege-restricted) configuration registers of the management circuit (partition manager) 12, in response to which the management circuit 12 configures the communications network for the graphics processing unit (slices) 11 accordingly. The controller 30 communicates with the management circuit (partition manager) 12 directly, via the restricted configuration bus 20.

To facilitate this operation, the management circuit (partition manager) 12 includes, inter alia, a set of control interfaces (communications interfaces) that may be used to control the management circuit to configure the groups of graphics processing resources, and then to use the resources in the groups. These control (communications) interfaces comprise respective address spaces and sets of registers that can be addressed by appropriate software executing on the processors (processor clusters).

Figure 12:
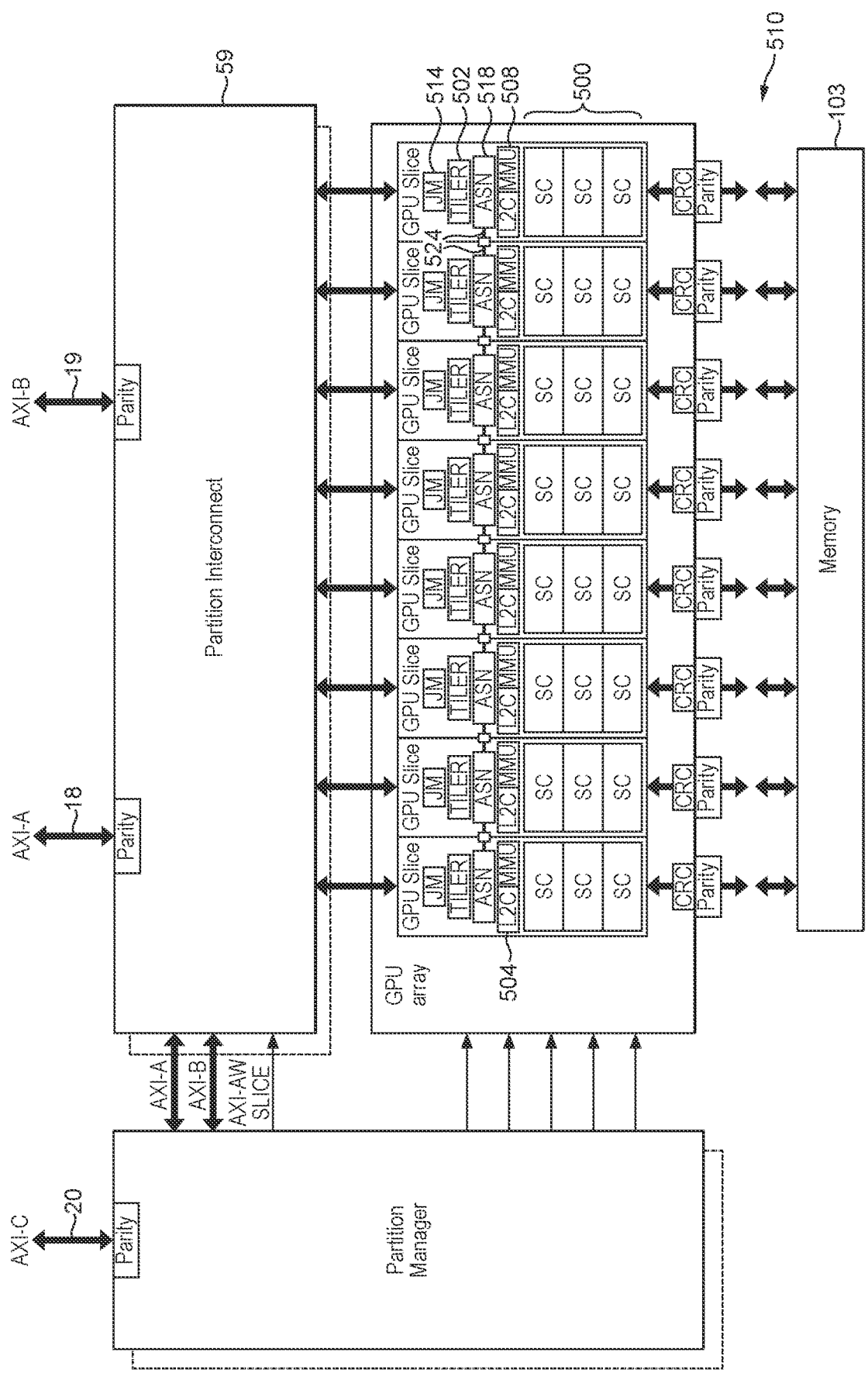
FIG. 12 shows schematically further details of the data processing system of FIG. 11.

FIG. 12 shows embodiments of the system shown in FIG. 11 in more detail. In particular FIG. 12 shows in more detail components of each graphics processing unit (graphics processor) (slice) 11 in this embodiment.

As shown in FIG. 12, in this embodiment, each graphics processing unit (slice) comprises one or more execution units, such as programmable processing (shader) cores 500 (SC) and a tiler 502. In this embodiment, each graphics processing unit is tile-based. Different graphics processing units 11 may have different sets of execution units, and there are more possible types of execution units than those shown in FIG. 12.

Each graphics processing unit also includes a level 2 cache 504 (L2) that acts as a memory channel to memory and inputs data to be used in the data processing tasks and outputs the resultant output data via a cache interface 510 connected to external system memory 103 via a suitable memory interconnect (not shown). Although FIG. 12 only shows a single level 2 cache in each graphics processing unit, some or all of the graphics processing units could include plural level 2 caches (and/or other forms of memory channel), as desired.

The graphics processing units may also include a memory management unit (MMU) 508, but this may also or instead be located externally to the graphics processing units.

Each graphics processing unit also includes a management unit, in the form of a job manager (JM) 514. This provides the software interface for the graphics processing unit 11, and thus receives (via a task interface) tasks (commands and data) for a virtual machine from a driver running on the CPU cluster in question, and divides a task given by the driver into subtasks and distributes the subtasks for execution to the various execution units (shader cores 500, tiler 502) of the graphics processing unit. Where a graphics processing unit 11 is able to operate as a master, the job manager 514 is configured to also be able to control execution units of linked slave graphics processing units. Correspondingly, for a graphics processing unit 11 that is able to operate as a slave, the job manager 514 is able to be disabled when the graphics processing unit is operating in slave mode.

As shown schematically in FIG. 12, the various functional units, etc., of each graphics processing unit are connected to each other via an asynchronous internal communications network 518 that carries various traffic such as memory transactions between execution units and the level 2 cache 504 (L2), subtask control traffic between the job manager 514 and execution units, and so on.

The internal communications network 518 is configured as a message-based interconnect that uses switches. Each functional unit of the graphics processing unit is associated with a corresponding (switching) node of the network, that is operable either to direct a message to its associated functional unit, or to pass the message on to the next node (to the next functional unit), as appropriate. The message routing and addressing on the internal communications network 518 is based on the network topology (sequence) of the nodes (functional units) of the graphics processing units.

As shown in FIG. 12, the internal communications networks 518 also have respective "external" connections (communications bridges) 524 to "outside" of the graphics processing unit and include appropriate switches (not shown) that can be activated to enable or disable communication across these connections. These communications bridges allow adjacent graphics processing units to be connected to, and to communicate with, each other, when they are to act as a partition of plural graphics processing units. In the present embodiment, the communication bridges 524 are implemented to support an asynchronous interface between graphics processing units, as this allows easier physical implementation of the graphics processing units as the clock can then be independent when the graphics processing units are linked.

The different operating modes of a graphics processing unit (standalone, master and slave modes) are set (enabled and disabled) by configuring the routing of the internal communications network 518 appropriately. Thus, for example, when the graphics processing unit is to operate in standalone mode, the external connections 524 are disabled to prevent communication via (across) the communications bridges. Correspondingly, when a graphics processing unit is to act as a master or slave, one or both sets of external connections 524 are enabled to allow communication with a connected graphics processing unit.

In the present embodiment, the internal communications network 518 is reconfigured by the management circuit (partition manager) 12 through a configuration interface of the graphics processing unit 11. Any routing configuration (or reconfiguration) in an embodiment only happens during reset of the graphics processing unit.

FIG. 12 also shows the configurable communications network 59 of the management circuit that, as discussed above, can be set under the control of the controller on the safety island 6 to configure the graphics processing units into the respective groups, and to be coupled to the appropriate one of the communication buses 18, 19, etc.

Figure 13:
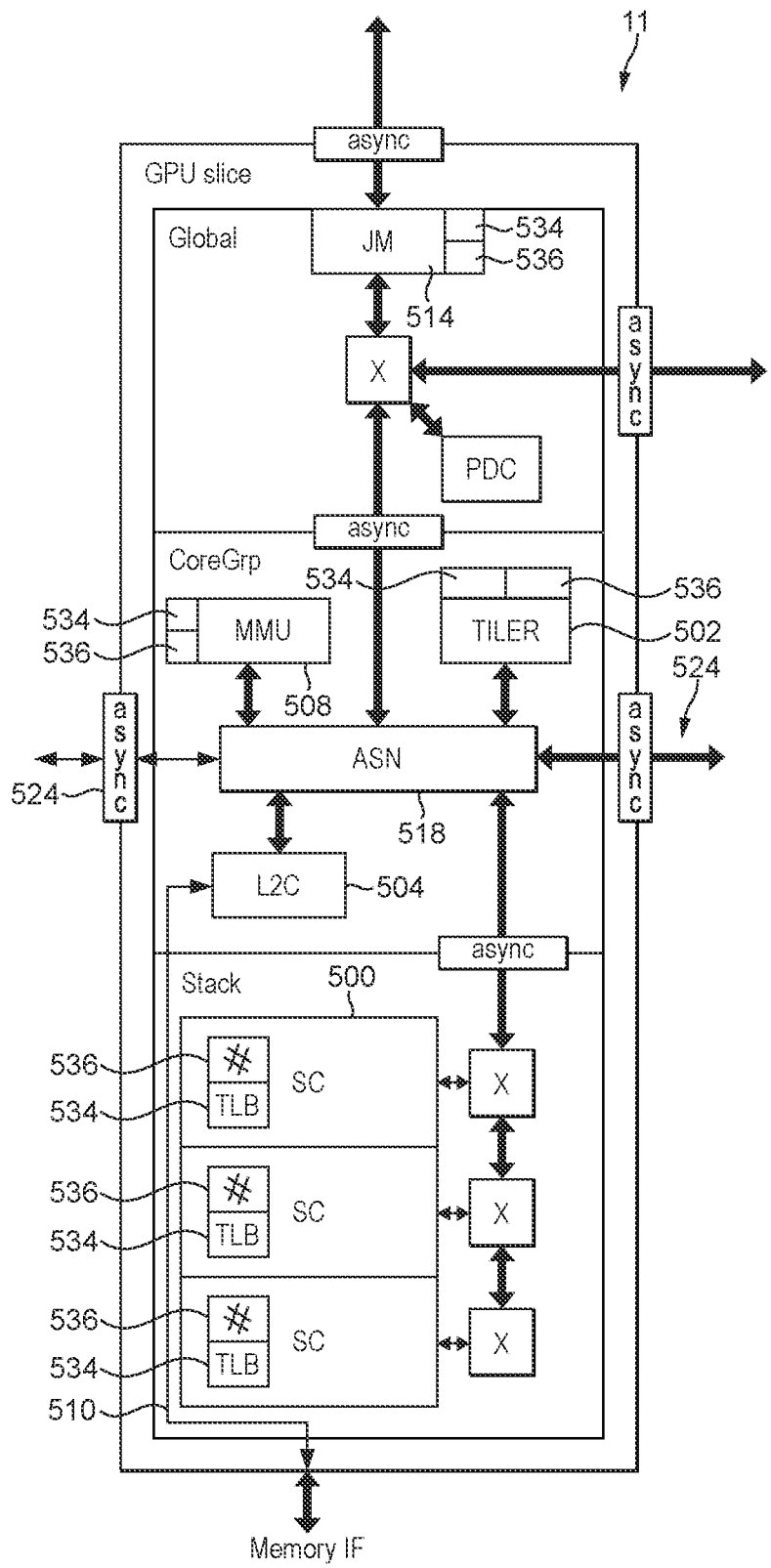
FIG. 13 shows schematically and in more detail components of a graphics processing unit of the data processing system of FIGS. 11 and 12.

FIG. 13 shows embodiments of the configuration of the graphics processing units (slices) 11 in the present embodiments. In particular, as shown in FIG. 13, in order to allow memory accesses from the different functional units of the respective graphics processing units in a partition to be distributed between the level 2 caches of the partition in accordance with, and in the manner of the present embodiments, and in particular as described above with reference to FIGS. 5 and 6, for example, each functional unit of a graphic processing unit 11 that will issue memory accesses to the external memory, has, in the present embodiments, an associated memory channel determining circuit of the form shown in FIG. 6, for determining which level 2 cache (i.e. memory channel) to send a given memory access from that functional unit to.

More particularly, each functional unit that may issue memory accesses to the external memory includes an address translation cache (e.g. a TLB (translation lookaside buffer)) 534 that can be used to store recent virtual memory to physical memory address translations for use by the functional unit, and has associated with it a corresponding memory channel determining circuit 536 as shown in FIG. 6 which operates to map the physical memory addresses for memory accesses generated by the TLB to corresponding intermediate addresses and to determine the level 2 cache of the partition to send the memory access to from the intermediate addresses.

As shown in FIG. 13, in this embodiment the shader cores 500 (SC), the tiler 502, the memory management unit (MU) 508 and the job manager 514 (JM) each have a respective TLB 534 associated with them, and each TLB 534 also has associated with it a memory channel determining circuit 536 that is operable to determine which level 2 cache of a partition to use in the manner of the present embodiments from the physical memory address determined by the TLB 534 for a memory access being made by the functional unit in question. The memory access will then be routed appropriately from the functional unit to the so-determined level 2 cache (memory channel).

FIG. 13 also shows the interface 510 to the external memory via (from) the level 2 cache 504 (L2) (that thereby acts as a memory channel to memory for the graphics processing unit).

It should be noted here that FIGS. 12 and 13 show an overview of the graphics processing units in this embodiment and are only schematic and for clarity purposes only show the elements, components, links, etc. of the graphics processing units, etc., that are relevant to the particular operation of the present embodiment that is being described.

Equally, the data processing system and/or graphics processing unit(s) of the present embodiments may include, as appropriate, one or more of the features described in US 2017/0236244, the entire contents of which is incorporated herein by reference, and/or US 2019/0056955, the entire contents of which is incorporated herein by reference.

As discussed above, the communications bridges 524 in these embodiments allow the graphics processing units (graphics processors) 11 to be connected together in partitions of one or more graphics processing units.

Figure 14:
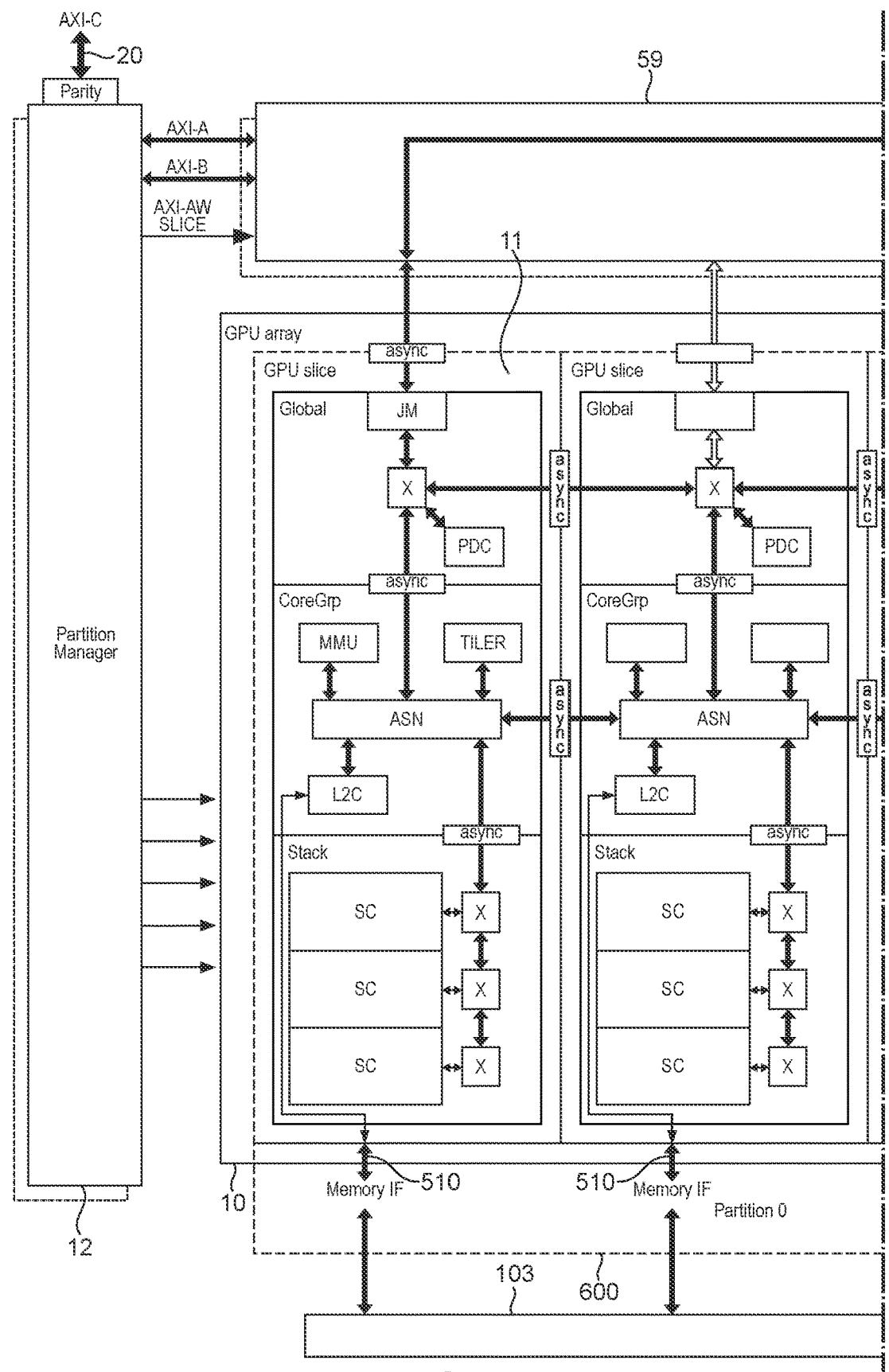
FIG. 14 shows schematically further details of the data processing system of FIGS. 11 and 12.
Figure 14:
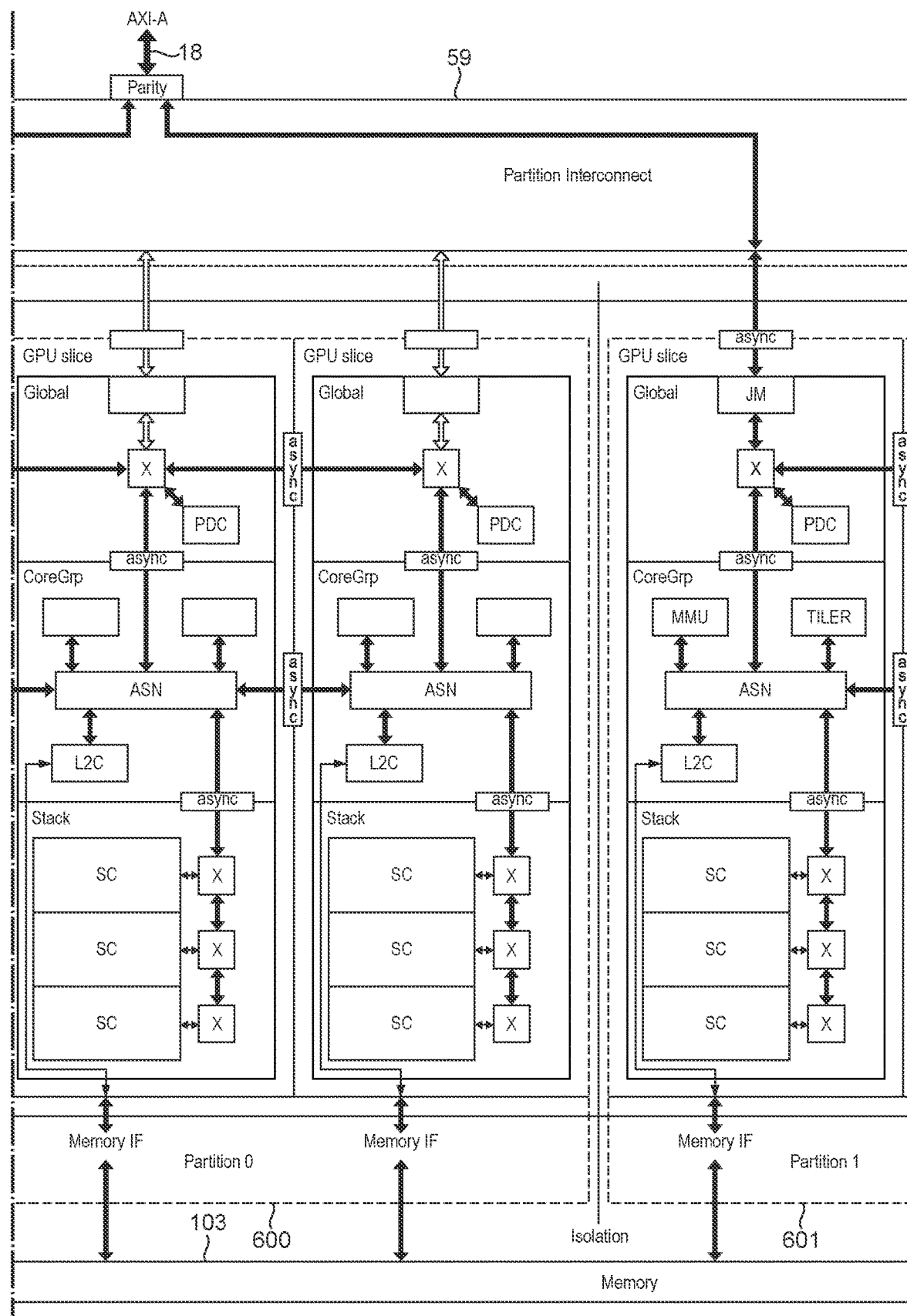
Figure 14:
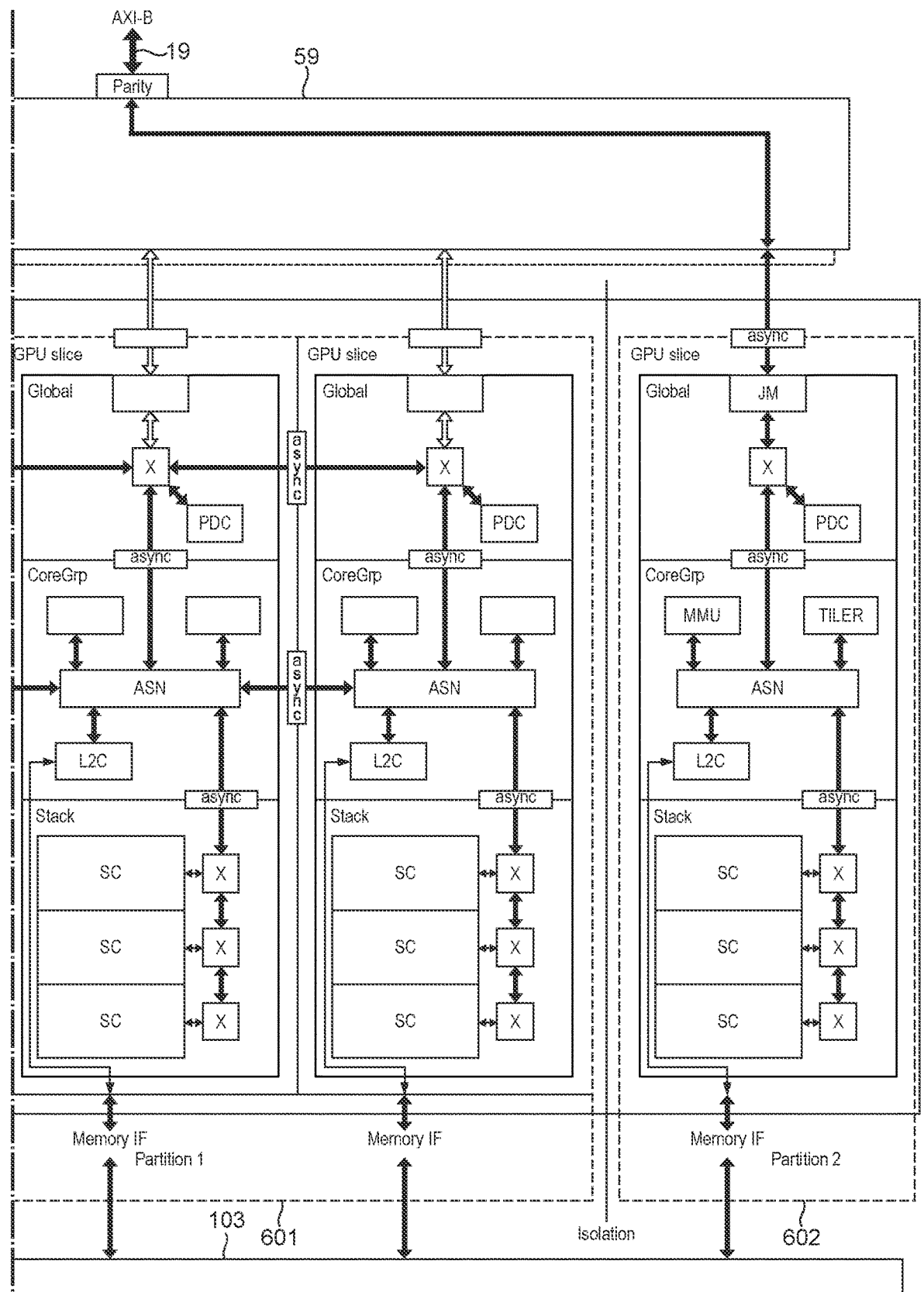

FIG. 14 shows some exemplary partition configurations in this regard. (In this Figure the connections between different partitions are shown as being "blocked", as the partitions will be isolated from each other. The communications bridges (and other connections) between graphics processing units include appropriate isolation logic for this purpose, to ensure no cross talk between different partitions in use.)

FIG. 14 shows an exemplary configuration having a first four graphics processing unit partition 600, a second three graphics processing unit partition 601, and a third single graphics processing unit partition 602. Other partition configurations are possible and supported.

As shown in FIG. 14, in the present embodiments, when two or more graphics processing units are operating as a linked partition (set) of a master and one or more slave graphics processing units, the tiler, MMU and job manager of the slave graphics processing units are disabled.

Correspondingly, when two or more graphics processing units are operating as a linked partition (set) of a master and one or more slave graphics processing units, the linked plural graphics processing units will contain multiple level 2 caches (comprising one level 2 cache per graphics processing unit in the partition). Thus, each partition will, in effect, have as many memory channels in the form of level 2 caches to the external memory as there are graphics processing units in the partition (and correspondingly reconfiguring the partitions to contain different numbers of graphics processing units, will change the number of memory channels (L2 caches) available to the processing units of the partition).

The partitions are correspondingly configured, as discussed above, in relation to FIGS. 1-4, as respective symmetric multiprocessing systems, such that each graphics processing unit (and the relevant functional units of each graphics processing unit) has access to all the level 2 caches in the partition and effectively sees all the level 2 caches in the partition as a "single" cache.

Accordingly, memory accesses from the different functional units of the respective graphics processing units in a partition are distributed between the level 2 caches of the partition in accordance with, and in the manner of the present embodiments, and in particular as described above with reference to FIGS. 5 and 6, for example. (Thus, as discussed above and shown in FIG. 13, each functional unit of a graphics processing unit that may issue memory accesses to the external memory has associated with it a corresponding memory channel determining circuit as shown in FIG. 6 which operates to translate the physical memory addresses for memory accesses generated by the TLB to determine the level 2 cache of the partition to send the memory access to.)

As will be appreciated from the above, the technology described herein, in its embodiments at least, can provide an improved system that will facilitate the appropriate distribution of memory accesses across plural memory channels, in particular in the case where the number of memory channels in use can vary. This is achieved in the embodiments of the technology described herein at least, by mapping memory addresses associated with memory accesses to intermediate addresses in an intermediate address space, and then determining the memory channels to use from the intermediate addresses.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilize the technology in various embodiments and with various modifications as are suited to the particular use contemplated. It is intended that the scope be defined by the claims appended hereto.

What is claimed is:

1. A method of determining a communication channel to use when accessing memory in a data processing system, the method comprising:
   determining which communications channel, of a plurality of communications channels that have been configured for use to access a memory, to use for an access to the memory, by:

mapping a memory address associated with the memory access to an intermediate address within an intermediate address space;

selecting a mapping operation to use to determine from the intermediate address which communications channel, of the plurality of communications channels that have been configured for use to access the memory, to use for the memory access; and using the selected mapping operation to determine from the intermediate address which communications channel, of the plurality of communications channels that have been configured for use to access the memory, to use for the memory access;

the method further comprising:

using the determined communications channel for the memory access, wherein the data processing system is a data processing system in which the number of communication channels for accessing the memory is configurable such that the number of communication channels that can be used for accessing the memory can vary, and wherein the mapping operation selected for use to determine from the intermediate address which communications channel, of the plurality of communications channels that have been configured for use to access the memory, to use for the memory access, is selected based on the number of communication channels that can be used for accessing the memory, such that:

(i) when the data processing system is configured so that a first number of memory channels can be used for accessing the memory, a first mapping operation is selected for use to determine from the intermediate address which communications channel, of the plurality of communications channels that have been configured for use to access the memory, to use for the memory access;

(ii) whereas when the data processing system is configured so that a different, second number, of memory channels can be used for accessing the memory, a different, second, mapping operation is selected for use to determine from the intermediate address which communications channel, of the plurality of communications channels that have been configured for use to access the memory, to use for the memory access to use for the memory access.

2. The method of claim 1, wherein the memory channels comprise intermediate storage elements that provide an interface to the memory, and the method comprises:

determining which intermediate storage element of a plurality of intermediate storage elements that have been configured for use to access a memory, to use for an access to the memory, by:

mapping a memory address associated with the memory access to an intermediate address within an intermediate address space;

selecting based on the number of intermediate storage elements configured for use to access the memory, a mapping operation to use to determine from the intermediate address which intermediate storage element of the plurality of intermediate storage elements configured for use to access the memory to use for the memory access; and using the selected mapping operation to determine from the intermediate address which intermediate storage element of the plurality of intermediate storage elements configured for use to access the memory to use for the memory access; and using the determined intermediate storage element for the memory access.

3. The method of claim 1, wherein the intermediate address space is smaller than the memory address space.

4. The method of claim 1, wherein the mapping of the memory addresses to the intermediate addresses is so as distribute one or more regular sequences of memory addresses evenly across the intermediate address space.

5. The method of claim 1, wherein the mapping of the memory addresses to the intermediate addresses is so as to map the memory addresses substantially randomly to the intermediate addresses.

6. The method of claim 1, wherein the mapping of the memory addresses to the intermediate addresses is so as to at least one of:

map a block of plural adjacent memory addresses to the same intermediate address;

map adjacent blocks of plural adjacent memory addresses to different intermediate addresses;

map each memory address of a block of plural adjacent memory addresses to different intermediate addresses; and map the memory addresses of adjacent blocks of plural memory addresses to the same set of plural different intermediate addresses, but with the memory addresses for the different blocks being mapped to the intermediate addresses in a different pattern of the intermediate addresses.

7. The method of claim 1, wherein the mapping of the memory addresses to the intermediate addresses is performed using a hash operation, the hash operation comprising:

for each of plural hash vectors, each hash vector corresponding to a bit position in the intermediate address:

performing a logical AND of the hash vector with the memory address and then performing a logical XOR of the result to thereby provide the output bit value for the intermediate address bit position corresponding to the hash vector.

8. The method of claim 1, wherein the intermediate address to memory channel mapping operation uses a Modulo operation, with the divisor value for the Modulo operation being set equal to the number of channels that have been configured for use to access the memory.

9. The method of claim 1, wherein the mapping of the memory addresses to the intermediate addresses is performed using a hash operation, the hash operation using a hash function that is calculated based on the memory address that is to be mapped to the intermediate address space.

10. The method of claim 1, wherein the memory address that is to be mapped to the intermediate address space is a physical memory address.

11. An apparatus for determining a communications channel to use when accessing memory in a data processing system in which varying numbers of communication channels for accessing memory can be configured, the apparatus comprising:

a memory channel determining circuit configured to determine which communications channel, of a plurality of communications channels that have been configured for use to access a memory, to use for an access to the memory, the memory channel determining circuit comprising:

an address mapping circuit configured to map a memory address associated with a memory access to an intermediate address within an intermediate address space using a hash operation, the hash operation using a hash function that is calculated based on the memory address that is to be mapped to the intermediate address space; and a memory channel mapping circuit configured to:
select, based on a number of communications channels that have been configured for use to access the memory, a mapping operation to use to determine from the intermediate address which communications channel, of the plurality of communications channels that have been configured for use to access the memory, to use for the memory access; and use the selected mapping operation to determine from the intermediate address which communications channel, of the plurality of communications channels that have been configured for use to access the memory, to use for the memory access.

12. The apparatus of claim 11, wherein:
the memory channels comprise intermediate storage elements that provide an interface to the memory;
the memory channel determining circuit is configured to determine which intermediate storage element of a plurality of intermediate storage elements that have been configured for use to access a memory, to use for an access to the memory; and
the memory channel mapping circuit is configured to:
select based on a number of intermediate storage elements configured for use to access the memory, a mapping operation to use to determine from the intermediate address which intermediate storage element of the plurality of intermediate storage elements configured for use to access the memory to use for the memory access; and
use the selected mapping operation to determine from the intermediate address which intermediate storage element of the plurality of intermediate storage elements configured for use to access the memory to use for the memory access.

13. The apparatus of claim 11, wherein the intermediate address space is smaller than the memory address space.

14. The apparatus of claim 11, wherein the mapping of the memory addresses to the intermediate addresses is so as to at least one of:
distribute one or more regular sequences of memory addresses evenly across the intermediate address space;
map the memory addresses substantially randomly to the intermediate addresses;
map a block of plural adjacent memory addresses to the same intermediate address;
map adjacent blocks of plural adjacent memory addresses to different intermediate addresses;
map each memory address of a block of plural adjacent memory addresses to different intermediate addresses; and
map the memory addresses of adjacent blocks of plural memory addresses to the same set of plural different intermediate addresses, but with the memory addresses for the different blocks being mapped to the intermediate addresses in a different pattern of the intermediate addresses.

15. The apparatus of claim 11, wherein the hash operation comprises:
for each of plural hash vectors, each hash vector corresponding to a bit position in the intermediate address:
performing a logical AND of the hash vector with the memory address and then performing a logical XOR of the result to thereby provide the output bit value for the intermediate address bit position corresponding to the hash vector.

16. The apparatus of claim 11, wherein the memory channel mapping circuit is configured to use a Modulo operation for the intermediate address to memory channel mapping operation, with the divisor value for the Modulo operation being set equal to the number of channels that have been configured for use to access the memory.

17. The apparatus of claim 11, wherein the memory address that is to be mapped to the intermediate address space is a physical memory address.

18. A data processing system comprising:
a plurality of processing cores that are configurable as different, respective partitions, with each partition comprising a respective set of one or more of the processing cores of the plurality of processing cores;
wherein:
each of the processing cores comprises:
one or more communication channels for accessing a memory, with the processing cores within a partition being configurable to use the memory channels of the processing core(s) within the partition to access the memory; and
one or more memory channel determining apparatus for determining which communications channel of a plurality of communications channels to use when accessing memory in a data processing system in which varying numbers of communication channels for accessing memory can be configured, the memory channel determining apparatus comprising:
a memory channel determining circuit configured to determine which communications channel, of a plurality of communications channels that have been configured for use to access a memory, to use for an access to the memory, the memory channel determining circuit comprising:
an address mapping circuit configured to map a memory address associated with a memory access to an intermediate address within an intermediate address space; and
a memory channel mapping circuit configured to:
select based on a number of channels configured for use to access the memory, a mapping operation to use to determine from the intermediate address which communications channel, of the plurality of communications channels that have been configured for use to access the memory, to use for the memory access; and
use the selected mapping operation to determine from the intermediate address which communications channel, of the plurality of communications channels that have been configured for use to access the memory, to use for the memory access; and
the data processing system further comprises:
a partition configuration circuit operable to configure the plurality of processing cores into respective partitions, each partition comprising a set of one or more of the processing cores of the plurality of processing cores, and to thereby configure the number of memory channels available to the processing cores of the one or more partitions.

19. The system of claim 18, wherein the processing cores are processing cores of graphics processors, and the memory channels comprise level 2 caches of the graphics processors that provide an interface to memory.

20. A non-transitory computer-readable medium comprising computer software code which when executing on at least one processor performs a method of determining a communications channel to use when accessing memory in a data processing system, the method comprising:
- determining which communications channel, of a plurality of communications channels that have been configured for use to access a memory, to use for an access to the memory, by:
  - mapping a memory address associated with the memory access to an intermediate address within an intermediate address space;
  - selecting a mapping operation to use to determine from the intermediate address which communications channel, of the plurality of communications channels that have been configured for use to access the memory, to use for the memory access; and
  - using the selected mapping operation to determine from the intermediate address which communications channel, of the plurality of communications channels that have been configured for use to access the memory, to use for the memory access;

the method further comprising:
using the determined communications channel for the memory access, wherein the data processing system is a data processing system in which the number of communication channels for accessing the memory is configurable such that the number of communication channels that can be used for accessing the memory can vary, and wherein the mapping operation selected for use to determine from the intermediate address which communications channel, of the plurality of communications channels that have been configured for use to access the memory, to use for the memory access, is selected based on the number of channels that can be used for accessing the memory, such that:

(i) when the data processing system is configured so that a first number of memory channels can be used for accessing the memory, a first mapping operation is selected for use to determine from the intermediate address which communications channel, of the plurality of communication channels that have been configured for use to access the memory, to use for the memory access;

(ii) whereas when the data processing system is configured so that a different, second number, of memory channels can be used for accessing the memory, a different, second, mapping operation is selected for use to determine from the intermediate address which communications channel, of the plurality of communications channels that have been configured for use to access the memory, to use for the memory access to use for the memory access.

* * * * *